(12) United States Patent
Dent

(10) Patent No.: US 6,996,380 B2
(45) Date of Patent: Feb. 7, 2006

(54) COMMUNICATION SYSTEM EMPLOYING TRANSMIT MACRO-DIVERSITY

(75) Inventor: Paul Wilkinson Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 437 days.

(21) Appl. No.: 09/915,896

(22) Filed: Jul. 26, 2001

(65) Prior Publication Data

US 2003/0092456 A1 May 15, 2003

(51) Int. Cl.
*H04Q 7/20* (2006.01)

(52) U.S. Cl. .................... 455/101; 455/133; 455/504
(58) Field of Classification Search .................. 455/101, 455/132, 133, 134, 135, 10, 564, 566; 370/277, 370/204, 208
See application file for complete search history.

(56) References Cited

U.S. PATENT DOCUMENTS

| | | | |
|---|---|---|---|
| 4,995,057 | A | 2/1991 | Chung |
| 5,481,572 | A | 1/1996 | Skold et al. |
| 5,499,272 | A | 3/1996 | Bottomley |
| 5,594,941 | A | 1/1997 | Dent |
| 5,619,503 | A | 4/1997 | Dent |

(Continued)

FOREIGN PATENT DOCUMENTS

| | | |
|---|---|---|
| EP | 0936781 | 8/1999 |
| EP | 1067710 | 1/2001 |
| EP | 1075122 | 2/2001 |
| EP | 1087545 | 3/2001 |
| EP | 1207645 | 2/2002 |
| WO | WO 9809381 | 3/1998 |
| WO | WO 9837671 | 8/1998 |
| WO | WO 9921375 | 4/1999 |
| WO | WO 0135548 | 5/2001 |
| WO | WO 0197474 | 12/2001 |
| WO | WO 0199453 | 12/2001 |

OTHER PUBLICATIONS

*Initial Estimation of Communication Efficiency of Indoor Wireles Channels*, G. J. Foschini and R. A. Valenzuela, Wireless Networks 3, pp. 141–154, 1997: Lucent Technologies, Ebll Labs Innovations, Crawford Hill Laboratory, Holmdel, NJ 07733, USA.

*On Limits of Wireless Communications in a Fading Environment When Using Multiple Antennas*, G. J. Foschini and M.J. Gans, Wireless Personal Communications, vol. 6 (No.3), pp. 311–335, Kluwer Academic Publishers, Mar. 1998: Lucent Technologies, Bell Labs Innovations, Crawford Hill Laboratory—R137, 791 Holmdel–Keyport Road, Holmdel, NJ 07733–0400, USA.

(Continued)

*Primary Examiner*—Nick Corsaro
(74) *Attorney, Agent, or Firm*—Coats & Bennett, P.L.L.C.

(57) ABSTRACT

Coherent transmit macro-diversity involves transmitting simultaneous signals from one or more transmitters to one or more wireless receivers. Transmit signals are formed as weighted combinations of the individual information signals for each of the wireless receivers. By properly weighting these receiver-specific signals, the combined signals combine at each receiver to cancel all but the desired information signal for that receiver. This improves reception performance and allows multiple receivers to operate on the same communication channel in the same area if desired. The weighting factors used to form the combined signals are based on propagation path characteristics between each of the transmit antennas and each of the receivers. This information is generally referred organized as a channel estimate matrix and is used to filter the information signals such that they may be combined in the required weighted combinations.

63 Claims, 16 Drawing Sheets

U.S. PATENT DOCUMENTS

| | | |
|---|---|---|
| 5,631,898 A | 5/1997 | Dent |
| 5,642,358 A | 6/1997 | Dent |
| 5,724,666 A | 3/1998 | Dent |
| 5,812,935 A | 9/1998 | Kay |
| 5,812,947 A | 9/1998 | Dent |
| 5,845,199 A | 12/1998 | Longshore |
| 5,848,060 A | 12/1998 | Dent |
| 5,867,791 A | 2/1999 | Chambert |
| 5,883,888 A | 3/1999 | St-Pierre |
| 5,887,027 A | 3/1999 | Cohen et al. |
| 5,909,460 A | 6/1999 | Dent |
| 5,930,248 A | 7/1999 | Langlet et al. |
| 5,940,741 A | 8/1999 | Briancon et al. |
| 5,940,742 A | 8/1999 | Dent |
| 5,963,874 A | 10/1999 | Mahler |
| 5,991,282 A | 11/1999 | Langlet et al. |
| 6,006,075 A | 12/1999 | Smith et al. |
| 6,067,324 A | 5/2000 | Harrison |
| 6,081,566 A | 6/2000 | Molnar et al. |
| 6,088,593 A | 7/2000 | Dent |
| 6,104,933 A | 8/2000 | Frodigh et al. |
| 6,144,711 A | 11/2000 | Pollack et al. |
| 6,434,366 B1 | 8/2002 | Harrison |
| 6,473,467 B1 | 10/2002 | Wallace |
| 2002/0036996 A1 | 3/2002 | Ozluturk et al. |

OTHER PUBLICATIONS

Ying–Chang, Liang et al: "Transmit Antenna Array Techniques for Cellular CDMA Systems" Personal, Indoor and Mobile Radio Communications, 1998. The Ninth IEEE International Symposium on Boston, MA, USA, Sep. 8–11, 1998, New York, NY, USA< IEEE, US, Sep. 8, 1998, pp. 1396–1400, XP010314608 ISBN: 0–7803–4872–9.

Kawakami E et al: "Multi–Stage Interference Canceller Systems With Accurate Radio Channel Estimation Under Fading Environment" 1997 IEEE $6^{th}$ International Conference on Universal Personal Communication Record. San Diego, Oct. 12–16, 1997, IEEE International Conference on Universal Personal Communications, New York, IEEE, US, vol. 2 conf. 6, Oct 12, 1997, pp. 475–479, XP010248754 ISBN; 0–7803–3777–8.

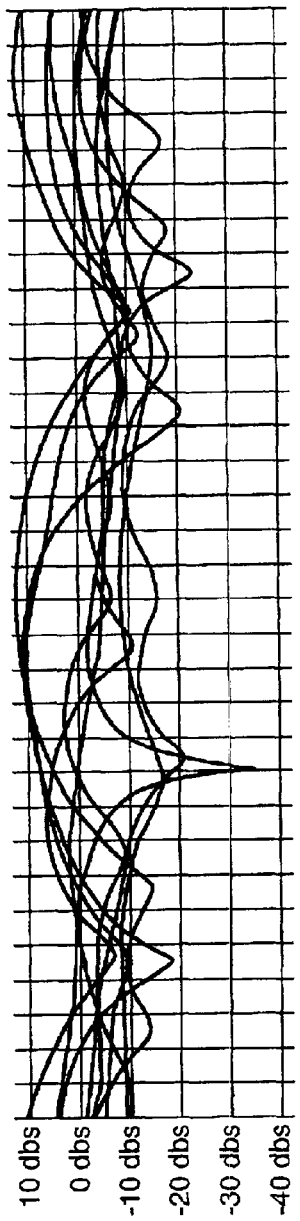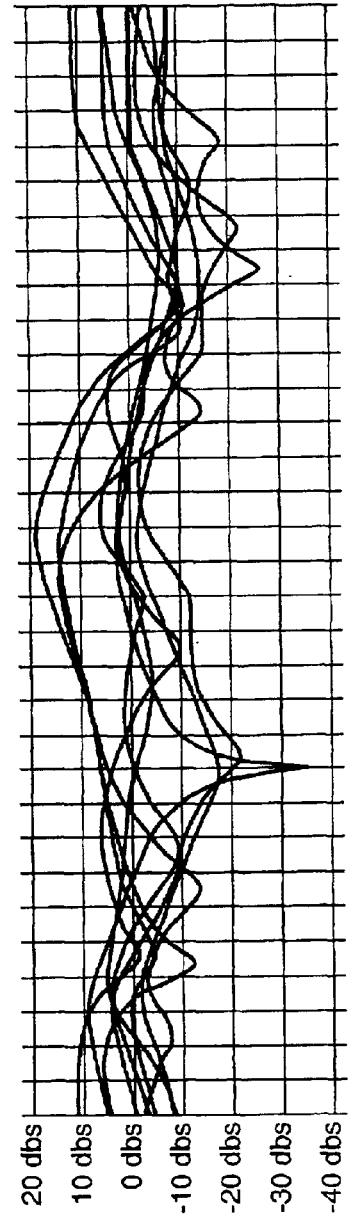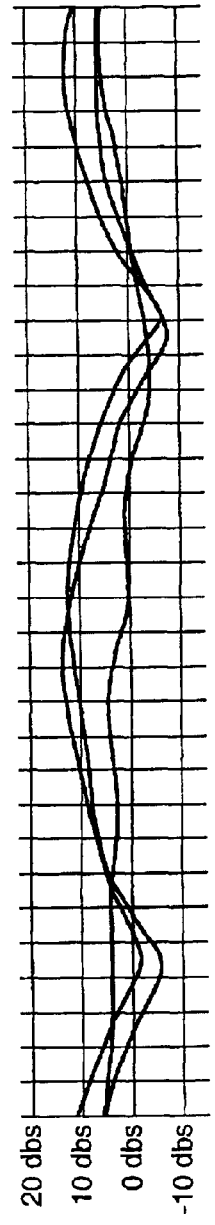

COMMUNICATION SYSTEM EMPLOYING TRANSMIT MACRO-DIVERSITY

BACKGROUND OF THE INVENTION

The present invention generally relates to wireless communication networks, and particularly relates to inventive coherent transmit diversity techniques that improve communication performance and efficiency.

Wireless communication networks employ various techniques to maximize their communication efficiency, performance, and economy. Economy and efficiency may be measured from the service provider's perspective, and generally relate to supporting the greatest possible number of users for lowest possible service and equipment costs. Performance may be measured from the perspective of both service providers and subscribers, and centers on providing the highest possible reliability at whatever data rate is being used.

Approaches to improving communication reliability are at least as numerous as the factors influencing that reliability. Thus, one sees a broad range of technologies and methods in modern communication systems, all meant to improve the underlying reliability of the communication services provided. Of these varied approaches, diversity communications itself represents a varied mix of techniques.

In wireless communication, successful reception depends on a relatively unobstructed signal path between a receiver and a supporting transmitter. If the path is obstructed, fading may occur. Fading may be particularly problematic when the wireless receiver is moving with respect to the transmitter. In this scenario, the signal path is ever changing and fading becomes a highly dynamic factor influencing reception quality.

Diversity combats fading by providing additional communication elements capable of transmitting or receiving on different signal paths in the hope that at least one of these signal paths will remain un-faded at any particular instant in time. Diversity may be implemented on the transmit side using different frequencies, antennas, polarizations, or combinations thereof to transmit to a given receiver.

Implementing diversity on the receive side, which is a more common practice, usually entails providing multiple receiving elements, such as two or more receive antennas. With multiple receiving elements, the receiver may receive its signal of interest on multiple signal paths, thus increasing the likelihood that at least one of the signal paths will be unobstructed at any instant in time.

With transmit macro diversity multiple transmitting antennas may be used to transmit signals to a given wireless receiver. When the antennas are individual elements in an antenna array, coherent transmit beamforming may be used to advantage. With this technique, reception performance is improved by the summation of transmit powers received from the multiple transmit antenna elements, as well as by the focusing of the transmit signal towards the receiver.

If the transmit antenna elements are not co-located, spatial transmit diversity may be achieved by transmitting the same signal from multiple, spaced-apart transmit antennas. However, non-coherent (e.g., time-offset) diversity signals transmitted in this manner increase the geographical spread of interference between different wireless receivers using the same communication channel.

SUMMARY OF THE INVENTION

The present invention relates to a method of providing coherent transmit macro diversity in a wireless communication network, such as a mobile cellular communications network. Multiple transmitters transmit signals to one or more wireless receivers. Signals transmitted from each transmitter are pre-processed before transmission using dynamic channel estimates characterizing the downlink propagation paths between that transmitter and each one of the one or more wireless receivers. Pre-processing in this manner attempts to compensate for the expected influence of the downlink propagation channels on the transmitted signal so as to minimize interference at the wireless receivers.

One of the many advantages arising from the above technique is that the same communication channel may be used to transmit to multiple wireless receivers operating in the same service area. This applies even where the receivers are co-located. In a cellular communication network, the ability to commonly assign one communication channel between multiple users, even if those users are immediately adjacent one another, represents a clear gain in system efficiency. For Time-Division Multiple Access (TDMA) systems, using the same communication channel for multiple users might entail assigning the same TDMA time slot on the same frequency channel to a group of wireless receivers operating in the same general area. For Code Division Multiple Access (CDMA) systems, using the same communication channel for multiple users might entail assigning the CDMA code channel for the group of wireless receivers.

Preferably, N transmitters transmit to M wireless receivers, where N is greater than or equal to M, although in some implementations, there may be more receivers than transmitters (M>N). Individual information signals intended for different ones of the wireless receivers are combined for each transmitter, based on the overall set of channel estimates characterizing the propagation paths between each transmitter and each wireless receiver. The goal of this pre-processing is to adjust the transmission characteristics of each information signal as a component in each combined transmit signal such that, at each wireless receiver, the desired information signal adds between the different transmit signals, while the unwanted information signals cancel. For any one wireless receiver, the desired information signal is the one intended for it, while the unwanted information signals are the information signals corresponding to the remaining wireless receivers.

The above goal may be realized through implementation of a central transmit processor or other like system that has access to the different information signals corresponding to the wireless receivers and to the propagation path information relating transmitters to receivers. This processor may receive the information signals from, for example, a mobile switching center handling call management for the involved wireless receivers, or from the involved base station controllers. Similarly, the processor may receive channel estimate information from elsewhere in the communication network, or may generate it locally, based on incoming data, such as loop back information from the wireless receivers that may be used to generate downlink channel estimates.

In any case, the transmit processor combines the information signals using the channel estimate information to form the transmit signals, such that the transmit signals, as received at each wireless receiver, combine to minimize interference at that receiver. Each transmit signal travels to the receivers through a different propagation channel, which may be a multipath channel, and this allows the transmit processor to fashion the set of transmit signals to achieve the desired interference cancellation at each wireless receiver.

Realizing the different propagation channels may involve transmitting each transmit signal from one in a set of spaced apart transmit antennas or antenna elements. In a cellular environment, this might involve distributing the transmit signals to a set of spaced apart radio base stations with the desired time-alignment between each of the transmit signals. In other instances, a single antenna assembly having a number of different polarizations may be used to transmit the different transmit signals, each one assigned to a different polarization. In all cases, coherency (e.g., relative time alignment) is preserved between the plurality of transmit signals.

Flexibility also exists in terms of forming the transmit signals. Conventionally, an information signal intended for a given wireless receiver is transmitted from a transmitter to the wireless receiver. Propagation path characteristics between the transmitter and receiver determine to what extent the received signal approximates the signal transmitted. With knowledge of these propagation path characteristics, the transmitted signal may be pre-compensated to offset channel effects in the received signal at the wireless receiver. How well the pre-compensation eliminates channel distortion at the receiver depends on the accuracy of the channel estimate.

The present invention uses dynamically updated channel estimate information to pre-compensate the transmit signal to effect the desired interference cancellation at each receiver. For example, current channel estimate information may be held in a memory accessible to the transmit processor. Because transmit diversity is employed, transmit signal pre-compensation entails forming a different weighted or filtered combination of the individual information signals for transmission for each transmitter using the channel estimate information.

One approach bases formation on matrix-oriented manipulations. A channel estimate matrix comprises matrix elements, each one of which characterizes the propagation channel between one transmitter (e.g., separate transmit antenna or different antenna polarization) and one of the wireless receivers. The transmit processor uses the channel estimate matrix to generate filters through which the information signals are passed and then combined. Information signals are passed through a different set of filters for each transmitter, as each transmitter has different propagation paths with respect to the various receivers.

In an exemplary approach, the transmit processor essentially applies the inverse of the channel estimate matrix to the set of information signals to generate the desired combinations of information signals which form the transmit signals. Forming an inverse matrix generally entails dividing the adjoint matrix by the determinant of the original matrix. Here, each element of the channel state matrix may be expressed in terms of the digital delay operator "z." If multipath exists, the elements are expressed as z polynomials.

One approach for realizing this is to form a logical array of Finite Impulse Response (FIR) filters that corresponds to the adjoint of the channel estimate matrix. Thus, each FIR filter in the array corresponds to the similarly positioned adjoint matrix element, which as noted may be expressed as z polynomial. Each information signal feeds into one row of the filter array, and sums are taken down the array columns to form the individual transmit signals. These filtering and summing operations create a set of transmit signals which, when passed through the involved propagation channels, will combine at each receiver in a manner that ideally cancels out all but that receiver's desired information signal.

In advance of passing the information signals into the FIR array, each information signal may be passed through an Infinite Impulse Response (IIR) filter based on the determinant of the channel estimate matrix. This is essentially equivalent to the "divide by" step noted in the inverse matrix algorithm above. Bringing in this determinant-based filtering process provides Inter-Symbol Interference (ISI) cancellation within the desired information signals received by the corresponding wireless receivers. Since the wireless receivers may themselves include ISI-compensation, considerable flexibility exists with regard to determinant-based filtering and root elimination.

As a variation on the above matrix processing, the channel estimate matrix may be expressed in terms of frequency response. That is, the propagation channels between transmitters and receivers are expressed in terms of their frequency response, and these expressions are evaluated over a range of frequencies. This evaluation allows the system to perform power spectral shaping, which allows the communication network to reduce or eliminate transmit power in portions of the spectrum where it is most attenuated. In this way, total transmit power is more efficiently used in transmission.

BRIEF DESCRIPTION OF THE DRAWINGS

FIG. 7A is a graph of the frequency responses for a set of adjoint matrix polynomials determined from an exemplary channel estimate matrix.

FIG. 7B is a graph of the frequency responses of the adjoint matrix polynomials divided by the associated reduced channel estimate matrix determinant.

FIG. 7C is a graph of the spectral shape of total transmit power to each one the group of wireless receivers illustrated in FIG. 5.

DETAILED DESCRIPTION OF THE INVENTION

Figure 1:
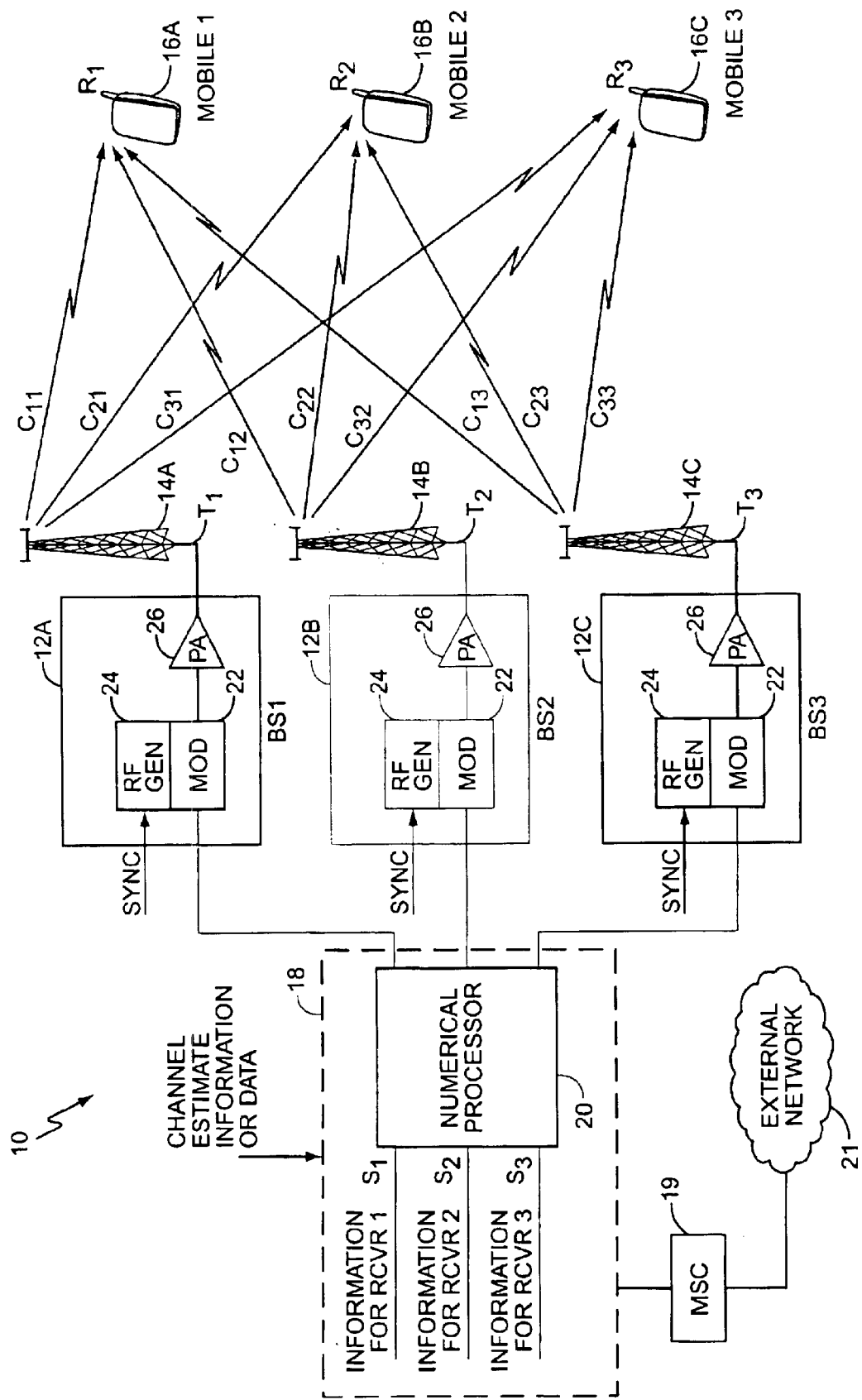
FIG. 1 is a diagram of an exemplary wireless communication network for practicing the present invention.

Turning now to the drawings, FIG. 1 illustrates an exemplary wireless communication network for practicing the present invention, generally referred to by the numeral 10. A plurality of base stations 12 transmit via corresponding transmit antennas 14 to a plurality of wireless receivers, shown here as mobile terminals 16. A central processing system, referred to herein as a transmit processor 18, provides transmit signals to each base station 12 in baseband form. In turn, each base station 12 converts its input transmit signal into a form suitable for transmission from its associated antenna 14. The transmit processor 18 may, for example, be associated with or be part of a mobile switching center (MSC) 19 that interfaces the network 10 with one or more external networks 21. Such external networks 21 may include the Public Switched Telephone Network (PSTN), and one or more packet data networks (PDNs), such as the Internet.

Although illustrated as using multiple, spaced-apart base stations 12 and antennas 14 to achieve transmit diversity to the mobile terminals 16, the network 10 may also use one or more antenna assemblies having multiple polarizations, wherein each transmit signal is transmitted using a different polarization. These polarized transmitting elements may be co-located. With the present invention, it is enough that the different transmit signals each be transmitted through an independently fading propagation channel. Obviously, this may be achieved in any number of different transmit configurations.

As illustrated, there is a one-to-one correspondence between the number of antennas 14 (e.g., transmitting elements or stations) and the number of mobile terminals 16. However, the present invention may be varied such that there are more or fewer transmit stations than there are wireless receivers.

Referring again to the illustration, base station 12A broadcasts transmit signal $T_1$ via antenna 14A, and likewise, base stations 12B and 12C broadcast transmit signals $T_2$ and $T_3$ via antennas 14B and 14C, respectively. Each transmit signal $T_X$ represents a weighted combination of different information signals intended for respective ones of the mobile terminals 16. Each mobile terminal 16 receives each of the transmit signals, albeit through different downlink propagation channels. That is, each mobile terminal 16 receives the combination of $T_1$, $T_2$, and $T_3$, as affected by the propagation channel between that mobile terminal 16 and point of transmission for $T_1$, $T_2$, and $T_3$. As used herein, the term "channel" refers to the radio signal propagation path or paths between a wireless transmitter and a wireless receiver, unless specifically noted otherwise.

The set of downlink channels between each transmit antenna 14 and each mobile terminal 16 may be represented using the nomenclature $C_{jk}$. This symbol denotes the channel between the jth wireless receiver (e.g., a given one of the mobile terminals 16) and the kth transmitter (e.g., a given one of the transmit antennas 14). Thus, in the illustration, $C_{11}$ denotes the channel between mobile terminal 16A and transmit antenna 14A, $C_{12}$ denotes the channel between mobile terminal 16A and transmit antenna 14B, and so on.

Typically, the propagation channel between a given antenna 14 and a given mobile terminal 16 comprises a number of downlink propagation paths. These multiple propagation paths, referred to as multipaths, each have characteristic attenuation, phase, and delay attributes, which may be expressed as a complex coefficient representing magnitude and phase, and a corresponding delay attribute. Thus, channel coefficient $C_{jk}$ may be represented by the polynomial $C_0 + C_1 z^{-1} + C_2 z^{-2} + \ldots + C_{n-1} z^{-(n-1)}$, where $C_n$ represents the channel coefficient associated with a single multipath and $z^x$ is a delay operator that represents the unit delay of the various multipaths relative to the first received multipath. The time delay operator could be expressed relative to a multipath other than the first received multipath, in which case the above expression might include channel coefficients with positive delay elements (e.g., $C_x z^{+4}$, $C_{x-1} z^{+3}$, and so on).

In any case, the above expressions demonstrate that the multipath channel between any transmit antenna 14 and a mobile terminal 16 may be expressed as a polynomial in z, based on the channel coefficients and corresponding path delays associated with the multipaths involved. The complete set of channel coefficients from all antennas to all receivers forms a channel estimate matrix and may be expressed as follows:

$$\begin{bmatrix} C_{11} & C_{12} & C_{13} \\ C_{21} & C_{22} & C_{23} \\ C_{31} & C_{32} & C_{33} \end{bmatrix} \quad \text{(Eq. 1)}$$

where each matrix element $C_{jk}$ is a polynomial that corresponds to one multipath channel between a given transmit station and a given mobile terminal. Again, transmit station broadly refers to the transmitting element associated with one of the transmit signals.

In this example, the present invention makes use of a channel estimate matrix to generate transmit signals $T_1$, $T_2$, and $T_3$ in such a manner as to allow the same downlink communication channel to be used by multiple mobile terminals 16 operating within the same service area. The transmit signals $T_1$, $T_2$, and $T_3$ comprise weighted combinations of information signals $S_1$, $S_2$, and $S_3$, which are intended for three different mobile terminals. Information signals $S_1$, $S_2$, and $S_3$ are combined such that at each mobile terminal 16 receives only its wanted signal, with the unwanted signals (e.g., those intended for the other mobile terminals 16) canceling.

To better understand the approach to the unwanted signal cancellation, it is helpful to examine the received signal R at any one of the receivers (e.g., mobile terminals 16). The signal received by a mobile terminal 16 during a given symbol period may be described by the following equation, $$R(i) = C_0 S(i) + C_1 S(i-1) + C_2 S(i-2) + \ldots + C_{L-1} S(i-L+1) \quad \text{(Eq. 2)}$$

where R(i) is the complex value of the received signal sample (with carrier frequency removed) at time instant i, S(i) is the symbol transmitted at time i, $C_j$ is the complex number describing the phase and amplitude of the propagation path with j-symbol periods of delay (relative to the shortest path, $C_0$), and L represents the number of multipaths between the antenna 14 and the mobile terminal 16.

The combination of a signal with itself delayed in steps of one symbol period may also be described by the use of the Z-transform. A discrete-time signal S that is delayed by one sample is denoted by $z^{-1} \cdot S$, where "z" is the time advance operator and its reciprocal is the time delay operator. Thus the polynomial $a + bz^{-1} + cz^{-2}$ times S means $aS(i) + bS(i-1) + cS(i-2)$.

Therefore, equation (1) can be written as:

$$R = C(z^{-1})S \quad \text{(Eq. 3)}$$

where "C" is now a polynomial, in $z^{-1}$, with coefficients $C_0 \ldots C_{L-1}$, and R stands for a received signal sample stream, while S stands for the corresponding transmitted symbol stream.

If $R_j$ denotes the signal received at receiver j and $T_k$ denotes the signal transmitted by transmit antenna k, the entire picture of propagation from all antennas 14 to all mobile terminals 16 may be described by the matrix equation, $$[R] = [C][T] \quad \text{(Eq. 4)}$$

where C is the channel estimate matrix from Eq. 1. For the 3×3 example of FIG. 1, Eq. (4) is expressed as, $$\begin{bmatrix} R_1 \\ R_2 \\ R_3 \end{bmatrix} = \begin{bmatrix} C_{11} & C_{12} & C_{13} \\ C_{21} & C_{22} & C_{23} \\ C_{31} & C_{32} & C_{33} \end{bmatrix} * \begin{bmatrix} T_1 \\ T_2 \\ T_3 \end{bmatrix} \quad \text{(Eq. 5)}$$

Here, $R_1$ is the composite signal received at mobile terminal 16A, $R_2$ is the composite signal received at mobile terminal 16B, and $R_3$ is the composite signal received at mobile terminal 16C. Similarly, $T_1$ is the transmit signal from antenna 14A, $T_2$ is the transmit signal from antenna 14B, and $T_3$ is the transmit signal from antenna 14C. Thus, each $R_x$ is a composite of the three transmit signals $T_1$, $T_2$, and $T_3$, each one received through a different propagation path relative to the receiver receiving $R_x$. In turn, each of the transmit signals $T_k$ comprises differently weighted components of each of the desired information signals $S_1$, $S_2$, and $S_3$.

If we desire each receiver j (e.g., a given mobile terminal 16) to receive only its intended symbol stream $S_j$, then the transmit signals $T_k$ needed to achieve that are given by, $$[T] = [C]^{-1}[S] \quad \text{(Eq. 6)}$$

where $[C]^{-1}$ is the inverse of the channel estimate matrix [C], and [S] is the matrix of desired information symbol streams intended for the set of mobile terminals 16. In (Eq. 6), each $T_k$ in [T] comprises a weighted combination of the information symbol streams $S_j$ intended for each receiver. Assuming that the channel coefficients for the propagation paths are estimated correctly, multiplication of the symbol stream matrix [S] by the inverse of the channel estimate matrix $[C]^{-1}$ yields the transmit symbol matrix [T] which results in complete cancellation of the unwanted signals at each mobile terminal 16. Thus the problem at hand concerns how to invert the channel estimate matrix [C] of z-polynomials, and whether such an entity exists and is numerically well or ill conditioned.

Matrix theory describes the procedure for computing the inverse of a matrix as follows. First, transpose the matrix then replace every element by its cofactor to obtain a matrix known as the adjoint matrix. Then divide each element of the adjoint matrix by the determinant of the original matrix to obtain the inverse matrix.

The determinant of a matrix is given by sums of products of its elements and is computable in a deterministic fashion. For example, assuming the following 3×3 channel estimate matrix, $$[C] = \begin{bmatrix} C_{11} & C_{12} & C_{13} \\ C_{21} & C_{22} & C_{23} \\ C_{31} & C_{32} & C_{33} \end{bmatrix} \quad \text{(Eq. 7)}$$

the determinant may be calculated as:

$$C_{11}(C_{22} \cdot C_{33} - C_{32} \cdot C_{23}) - C_{12}(C_{21} \cdot C_{33} - C_{31} \cdot C_{23}) + C_{13}(C_{21} \cdot C_{32} - C_{31} \cdot C_{22}) \quad \text{(Eq. 8)}$$

The cofactor of element $C_{11}$ is $(C_{22} \cdot C_{33} - C_{32} \cdot C_{23})$, which is therefore the first element of the adjoint matrix. The first element of the inverse matrix is thus, $$\frac{(C_{22} \cdot C_{33} - C_{32} \cdot C_{23})}{\begin{array}{l} C_{11}(C_{22} \cdot C_{33} - C_{32} \cdot C_{23}) - \\ C_{12}(C_{21} \cdot C_{33} - C_{31} \cdot C_{23}) + \\ C_{13}(C_{21} \cdot C_{32} - C_{31} \cdot C_{22}) \end{array}} \quad \text{(Eq. 9)}$$

When each matrix element $C_{jk}$ in the above expression is a z-polynomial, it may be deduced that the expression's numerator is a z-polynomial of twice the order of the $C_{jk}$, while the denominator is a polynomial of three times the order of $C_{jk}$. Therefore, the inverse matrix comprises elements that have both a numerator z-polynomial and a denominator z-polynomial. According to Eq. 6, information bearing signals $S_j$ to be transmitted to the mobile terminals 16 must be processed by multiplication with respective inverse matrix elements and summed to produce the transmit signals $T_k$.

Processing a signal $S_j$ by multiplication with a numerator polynomial is not problematic, and only involves delaying the signal by multiples of a symbol period, along with proper weighting and adding. A finite impulse response (FIR) filter may be used to implement these steps. The signal might conveniently be assembled into blocks, such as TDMA bursts, and a whole burst processed at once within digital signal processing memory before being output to transmit modulator circuits. The processed burst is longer than the original by the length of the impulse response of the processing z-function, but can be prevented from overlapping adjacent bursts by allowing a guard time between bursts, as is common in TDMA and GSM cellular systems. In the case of a continuous signal, such as in CDMA for example, the signal can be segmented into blocks, processed in the same way as described above for a TDMA burst, and then the processed segments, which are now longer and overlap, may be linearly superposed so that the extended tails add to the neighboring segments. It is acceptable for the impulse response tails to overlap neighboring segments so long as the intended receiver positions are the same for the neighboring segments. When the intended receiver positions are different for neighboring segments, the tails of a previous segment overlapping a new segment would cause interference to be transmitted in the direction of the new receivers. In this case, adequate guard times should be used, or alternatively a means to allocate receivers to timeslots based on position can be used so that the spatial pattern of receivers served in adjacent timeslots is similar.

Processing a signal by a denominator z-polynomial is more problematic however. A denominator z-polynomial may be realized as an Infinite Impulse Response (IIR) filter. The impulse response tails off exponentially as a function of the successive powers of the poles of the z-polynomial, i.e. the roots of the denominator polynomial. Thus, if a root of the denominator polynomial has a magnitude less than 1, the impulse response decays; if the root has a magnitude equal to one, the impulse response rings forever; and if the root has a magnitude greater than one, the impulse response grows. The latter case may be dealt with by processing the hypothesized signal block backwards in time to apply those roots that are greater than unity. Thus, the signal block may be passed backwards through an IIR filter comprised of the reciprocal roots of the denominator polynomial, which are less than unity, and therefore give a decaying time-reversed impulse response. The roots that were already less than unity form an IIR filter, which is applied in the forward time direction. It remains to determine what to do about roots that lie close to unity. Due to their slow decay, excessive latency in processing the signal exactly would be entailed. If the signal is not processed accurately, by truncating the IIR response for example, there is a risk of causing excessive interference overlap with adjacent blocks because the exact inverse C-matrix would not have been applied.

If the exact inverse C-matrix (downlink channel coefficient matrix) is applied to the information signals $S_j$ to form the transmit signals $T_k$ from each of the antennas 14, the mobile terminals 16 will receive only their intended information signal $S_j$ with multipath interference already canceled at the transmitter, since the resulting channel from the transmitter to the receiver is $[C]\cdot[C]^{-1}$, which is unity.

Omitting division by the troublesome denominator polynomial is equivalent to multiplying each information signal $S_j$ by the omitted denominator polynomial, so the resultant channel from each antenna 14 to each mobile terminal 16 would be equal in length to that omitted polynomial, which in the above 3×3 example was three times the length of the individual channel coefficients $C_{jk}$. The mobile terminals 16 may have an equalizer that can decode symbols in the presence of normal amounts of multipath propagation delay, but perhaps not three times the normal amount. Therefore omitting the entire denominator polynomial may produce a net channel whose impulse response length exceeds the receiving equalizer's capability. However, one third of the factors in the denominator polynomial may be omitted and this omission is equivalent to multiplying by a polynomial of ⅓rd the order of the denominator polynomial, thereby creating an artificial multipath channel with the same impulse response length as the original multipath channel.

According to one aspect of this invention therefore, ⅓rd of the denominator factors are omitted. The omitted factors are those corresponding to the roots of magnitude closest to unity, which are the terms that cause the most slowly decaying impulse responses, as well as peaks in the frequency spectrum of transmitted energy. Preferably, the roots having logmagnitude closest to zero may be selected as the roots of magnitude closest to unity.

Referring still to FIG. 1, information symbol streams $S_1$, $S_2$, and $S_3$ intended respectively for mobile terminals 16A, 16B, and 16C are input to a central transmit processor 18 that serves a plurality of base stations 12A, 12B and 12C. Transmit processor 18 includes a numerical processor 20 to perform the matrix operations on the information signals as described above. The transmit processor 18 may comprise one or more processors, such as digital signal processors, or may be comprise a portion of another network processing system, such as the MSC 19 mentioned earlier.

Using knowledge of the multipath channels $C_{jk}$, the numerical processor 20 filters the information signals $S_1$, $S_2$ and $S_3$ and forms weighted combinations of the information signals $S_1$, $S_2$ and $S_3$ to generate transmit signals $T_k$. The information signals $S_1$ $S_2$ and $S_3$ may be processed by the numerical processor 20 at baseband, which equates to symbol-rate processing. Processing by the numerical processor 20 is described in greater detail below.

The transmit signals $T_k$ are relayed from the transmit processor 18 to respective base stations 12A, 12B, and 12C, where they are converted to continuous time waveforms by digital-to-analog converters (not shown) and up-converted to a desired radio frequency channel by modulators 22 in respective base stations 12A, 12B, and 12C. The up-converted signals are then amplified to desired transmit power levels by PAs 26 in each of the base stations 12 and transmitted by respective antennas 14A, 14B, and 14C. The transmit signals $T_k$ (e.g., $T_1$, $T_2$, and $T_3$) propagate to the mobile terminals 16A, 16B, and 16C by way of the multipath channels $C_{jk}$. With the inventive generation of the transmit signals $T_k$, each mobile terminal 16 receives only the information signal intended for that mobile terminal 16 with the unwanted information signals canceling.

In FIG. 1, the antennas 14 may be on the same mast or tower on the same site (e.g., base station 12) or on different towers at different sites, as shown. In the latter case, the connection from the outputs of transmit processor 18 to the inputs of modulators 26 may be made by auxiliary intra-network communications means, such as optical fiber links, wireline or microwave links, always observing the necessary precautions to maintain the phase coherency between the transmit signals $T_k$ across all antennas 14. U.S. Pat. No. 5,594,941, entitled "A cellular/satellite communications system with generation of a plurality of sets of intersecting antenna beams," discloses various means to accomplish this coherency requirement and is incorporated in its entirety herein by reference.

Figure 2:
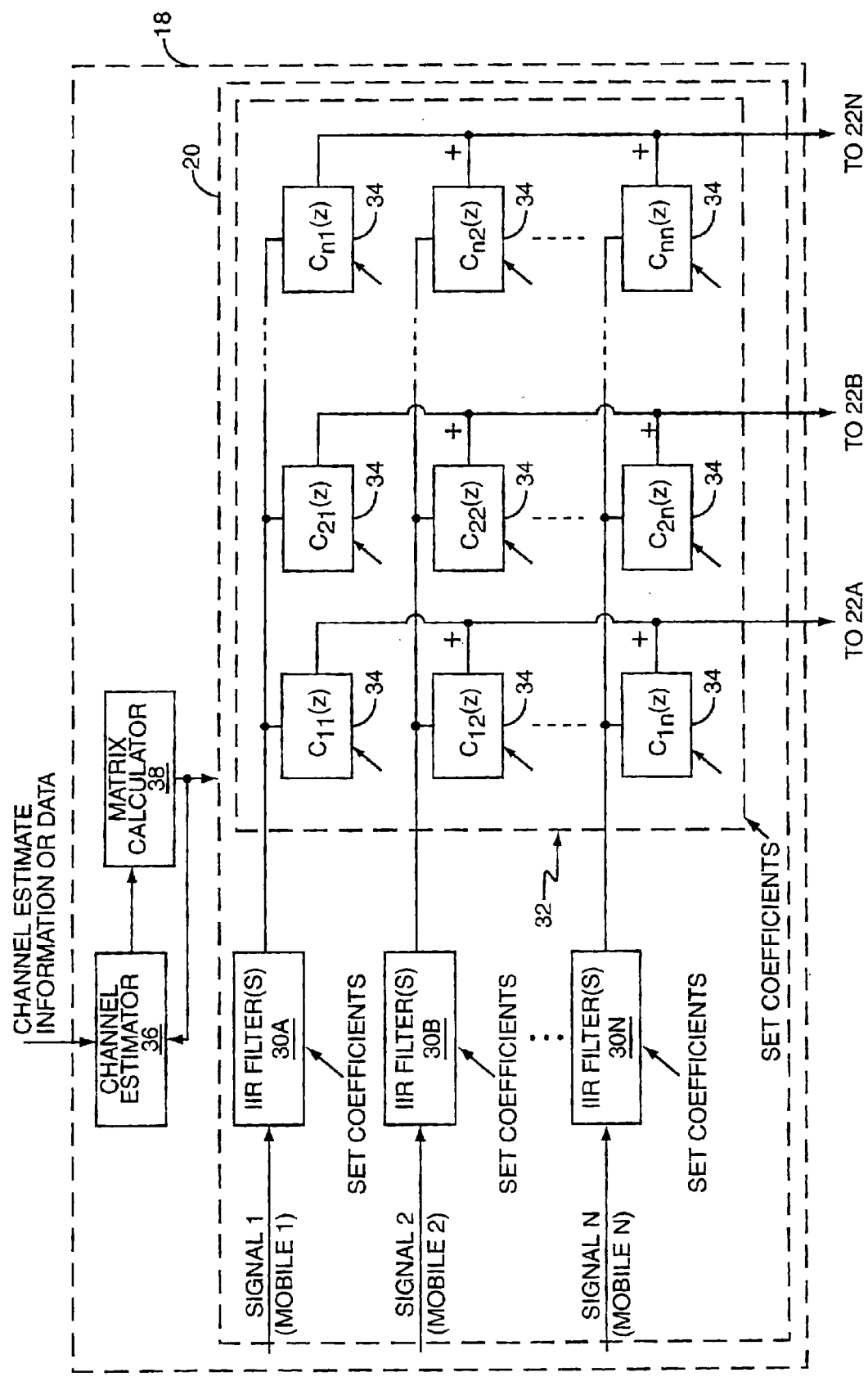
FIG. 2 is a diagram of the transmit processor of FIG. 1.

FIG. 2 illustrates the transmit processor 18 and numerical processor 20 in greater detail. The illustration assumes N transmit antennas 14 transmitting N transmit signals to N mobile terminals 16. Numerical processor 20, as previously described, processes the information signals $S_1$, $S_2$ and $S_3$ to form the set of transmit signals, $T_1$ $T_2$ and $T_3$ that results in unwanted signal cancellation at each mobile terminal 16. Numerical processor 20 comprises a set of IIR filters 30 and an array 32 of FIR filters 34. Transmit processor 18 includes, in addition to the numerical processor 20, a channel estimator 36 and a matrix calculator 38.

The channel estimator 36 derives the set of channel coefficients characterizing the multipath channels $C_{jk}$ between each of the antennas 14 and each of the mobile terminals 16. The set of coefficients output from channel estimator 36 is referred to herein as channel state information (CSI). The channel estimator 36 outputs these channel coefficients to the matrix calculator 38, which calculates the coefficients of the IIR and FIR filters as previously described. More particularly, the channel estimator 36 provides N×N×L channel coefficients describing the N×N multipath channels $C_{jk}$ from each one of the N antennas 14 to each one of the N mobile terminals 16. L is the impulse response length of the multipath channels $C_{jk}$, which equates to the number of multipaths in each multipath channel $C_{jk}$.

Treating each set of channel coefficients as a z-polynomial of order L and as an element of an N×N square matrix (i.e., the channel estimate matrix above), the matrix calculator 38 forms the N×N adjoint matrix, whose elements are polynomials of order (N−1)L, and a determinant polynomial of order NL. Matrix calculator 38 factors the determinant polynomial to determine the NL roots of the determinant polynomial and deletes the L roots having smallest absolute value of logmagnitude, leaving (N−1)L roots forming a reduced determinant polynomial of order (N−1)L. The reduced determinant polynomial determines the IIR filter as previously described and the adjoint matrix determines the coefficients of the FIR filters 34 in filter array 32.

The information bearing signals $S_j$ (e.g., symbol streams $S_1$, $S_2$, and $S_3$) carrying desired information for mobile terminals 16A, 16B, and 16C, respectively are input to numerical processor 20. Within the numerical processor 20, signals $S_j$ are processed through IIR filters 30 of order (N−1)L corresponding to the reduced denominator polynomial and through FIR filters 34 of order (N−1)L corresponding to the adjoint matrix polynomials as follows.

Information blocks intended to be transmitted to different mobile terminals 16 are assembled in the transmit processor 18. First the information signals are IIR filtered by the respective IIR filters 30A–30N, which compensates for anticipated intersymbol interference (ISI) caused by delayed versions of the same signal $S_j$. In this exemplary implementation, the IIR filters 30 are formed from the determinant z-polynomial of the channel estimate matrix [C], and may be reduced in order by omission of factors corresponding to roots closest to the unit circle as previously described. The number of roots omitted may be anything from none up to the equalizer capability of the respective mobile terminals 16. The IIR filters 30 comprise one or more filter elements corresponding to the reciprocals of the roots of the reduced determinant z-polynomial. Each information block is passed in the reverse time direction through those filter elements formed from the reciprocals of roots of the reduced determinant that have a magnitude greater than unity and in the forward time direction through filter elements formed from the reduced determinant roots of magnitude less than unity to obtain IIR-processed blocks.

Each omitted root requires the mobile terminal receiver to deal with one extra symbol period worth of multipath time dispersion. If the respective mobile terminals 16 have different receiver equalizer capabilities, the corresponding IIR filters 30A . . . 30N could be different, with different numbers of factors omitted in each filter 30. The IIR filters 30 may also differ by factors intended to optimize communication efficiency separately for each mobile terminal 16, as will be further discussed below. IIR filter coefficients in each of the IIR filters 30 are updated as needed based on changing CSI.

The IIR processed blocks are then FIR processed by matrix multiplication with the adjoint matrix polynomials to obtain transmit signal blocks. Filter array 32 comprising FIR filters 34 process the IIR-filtered signals to compensate for interference between signals $S_1$, $S_2$, and $S_3$ at the mobile terminals 16. Each signal is processed by a corresponding row of FIR filters 34 in the FIR filter array 32. The output signals from FIR filters 34 are summed down filter array columns, indicated by the + sign at the junction of the line from one output to another. These summed outputs represent the baseband combined transmit signals relayed by the transmit processor 18 to the modulators 22A . . . 22N used to generate transmit signals $T_1$ . . . $T_N$, which are in turn transmitted by transmit antennas 14A . . . 14N.

Note that each of the FIR filters 34 is updated with new coefficients as needed based on changing propagation path channel coefficients. Also, note that the FIR filters 34 in the filter array 32 correspond to elements in the adjoint of the channel estimate matrix C. Thus, each signal input into the filter array 32 is processed by a row of filters 34 corresponding to a respective row in the adjoint matrix discussed above.

The transmit signal may be further filtered to restrict transmission bandwidth and up-sampled and converted to continuous time signals. The transmit signals, denoted as $T_1$, $T_2$, and $T_3$ in the illustration, are output by the transmit processor 18 and coupled to corresponding base stations 12, which may be base transceiver stations (BTSs). A modulator 22 in each BTS modulates the input transmit signal onto an RF carrier signal, which is amplified by a suitable RF power amplifier (PA) 26 to make the transmit signals (i.e., $T_1$, $T_2$, or $T_3$) discussed above suitable for transmission. Since IIR, FIR and bandwidth-restriction filtering are all linear processes, they may be carried out in any order. Generating $T_1$, $T_2$, and $T_3$ in this manner causes the combination of transmit signals to cancel differently at each mobile terminal 16, such that each mobile terminal 16 receives only its desired signal.

The above-mentioned polynomial lengths apply to the case where the three transmitting antennas 14 are on the same sites or nearby sites. The base stations 12 (or, more generally, RF generation resources) and corresponding antennas 14 need not be on the same site. Rather, the base stations 12 with their corresponding transmit antennas 14 can be located apart from one another, with each linked to the transmit processor 18 by optical fiber landline for example. Different sites (e.g., base stations 12) must however synchronize the frequencies of their radio frequency carrier generators 24 to the same stable reference, using GPS for example.

The relative phases of the transmit signals $T_K$ must be at least as stable as the changes in multipath propagation channel coefficients, which means that their relative frequency accuracy should be better than the Doppler frequency caused by relative motion between the transmit antennas 14 and the mobile terminals 16. This ensures that the mechanism used to keep the transmit processor 18 provided with up-to-date and accurate CSI is also sufficient to compensate for any phase difference or phase drift between sites. When the three transmitting antennas 14A, 14B, and 14C are on different sites far apart, the polynomial orders may be somewhat higher, owing to the potentially greater relative path delays, as will be further discussed below.

Figure 3:
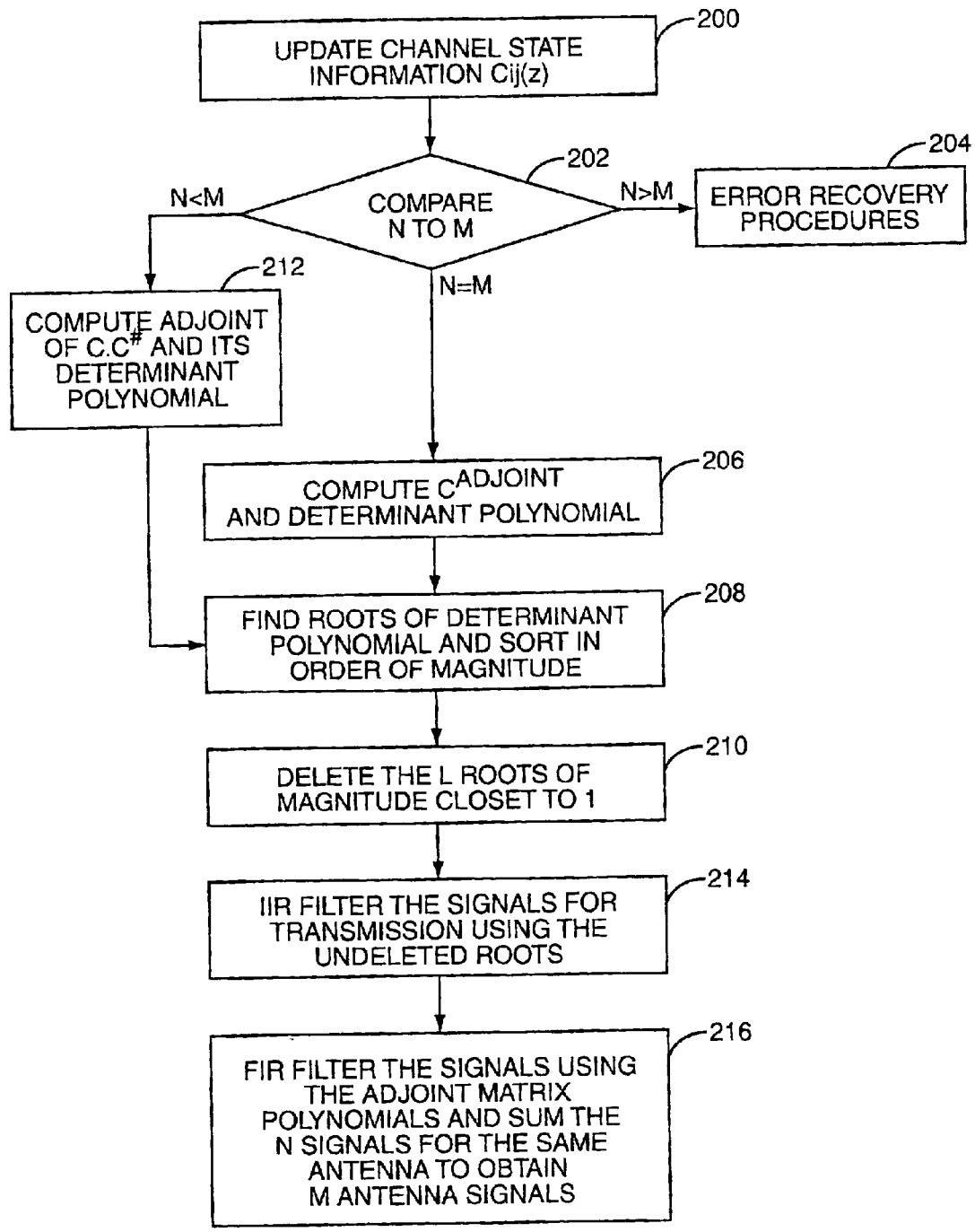
FIG. 3 is a diagram of exemplary transmit signal pre-processing.

FIG. 3 is a flowchart illustrating the operation of the transmit processor 18 located in the network 10 for determining the coefficients of the IIR filters 30 and FIR filters 34 based on channel state information (CSI). Processing begins (block 200) with updating the CSI information to reflect latest estimates of the downlink channel z-polynomials comprising the channel estimate matrix C.

Once the CSI values are updated, the transmit processor 18 determines whether the network 10 is transmitting to a greater, lesser or equal number M of mobile terminals 16 compared to the number N of antennas 14 at its disposal (block 202). This test entails an evaluation of the number of mobile terminals 16 as compared to the number of transmit antennas 14 for a commonly assigned communications channel.

In some implementations, the network 10 and particularly the transmit processor 18 are not configured for transmit preprocessing when M>N. In these implementations, M>N constitutes an error condition. Error recovery procedures (block 204) can for example comprise selecting to serve only the first N mobile terminals 16 and not the remaining M−N mobile terminals 16.

If N=M, the matrix C is square and it is effectively inverted by computing the adjoint matrix of polynomials already noted and the determinant polynomial (block 206). The determinant polynomial is then factored, i.e. its roots are found, and the roots are sorted in order of magnitude (block 208). Then, the L roots and factors that are closest in magnitude of "1" are optionally discarded (block 210). The number L of roots and factors discarded for each mobile terminal 16 may be different if the mobile terminals 16 have different equalizer capabilities, which the network 10 would be informed about in advance.

If the number M of mobile terminals 16 is less than the number N of transmitting antennas 14 (transmit sites), then the extra degrees of freedom are used to optimize performance when computing the matrix $C \cdot C^\#$ of polynomials of length 2L (block 212). Then the adjoint matrix of this matrix is computed, as is its determinant (block 212). The adjoint matrix polynomials are of length 2L(N−1) and the determinant polynomial is of length 2NL. Apart from this, however, the procedure is the same as for N=M (block 206). Thus, the roots are magnitude sorted (block 208), and the L roots closest to a magnitude of "1" are deleted (block 210).

In both the M<N and the N=M cases, the determinant polynomial is now of length (2N−1)L after deleting the L roots closest to the unit circle. The results of the above processing are then used to set the IIR filtering (e.g., filters 30) applied to the input information symbol streams (block 214). Likewise, the FIR filtering is configured based on the above processing and applied to the post-IIR filtered signals for additional filtering, combining, and outputting as illustrated in FIG. 2 (block 216).

Where the mobile terminals 16 are the same and IIR filters 30 are all the same, the net channels (paths) by which respective signals reach respective mobile terminals 16 are identical, despite different propagation coefficients. In effect, the transmit preprocessing of the information signals compensates exactly for the different channels.

Figure 5:
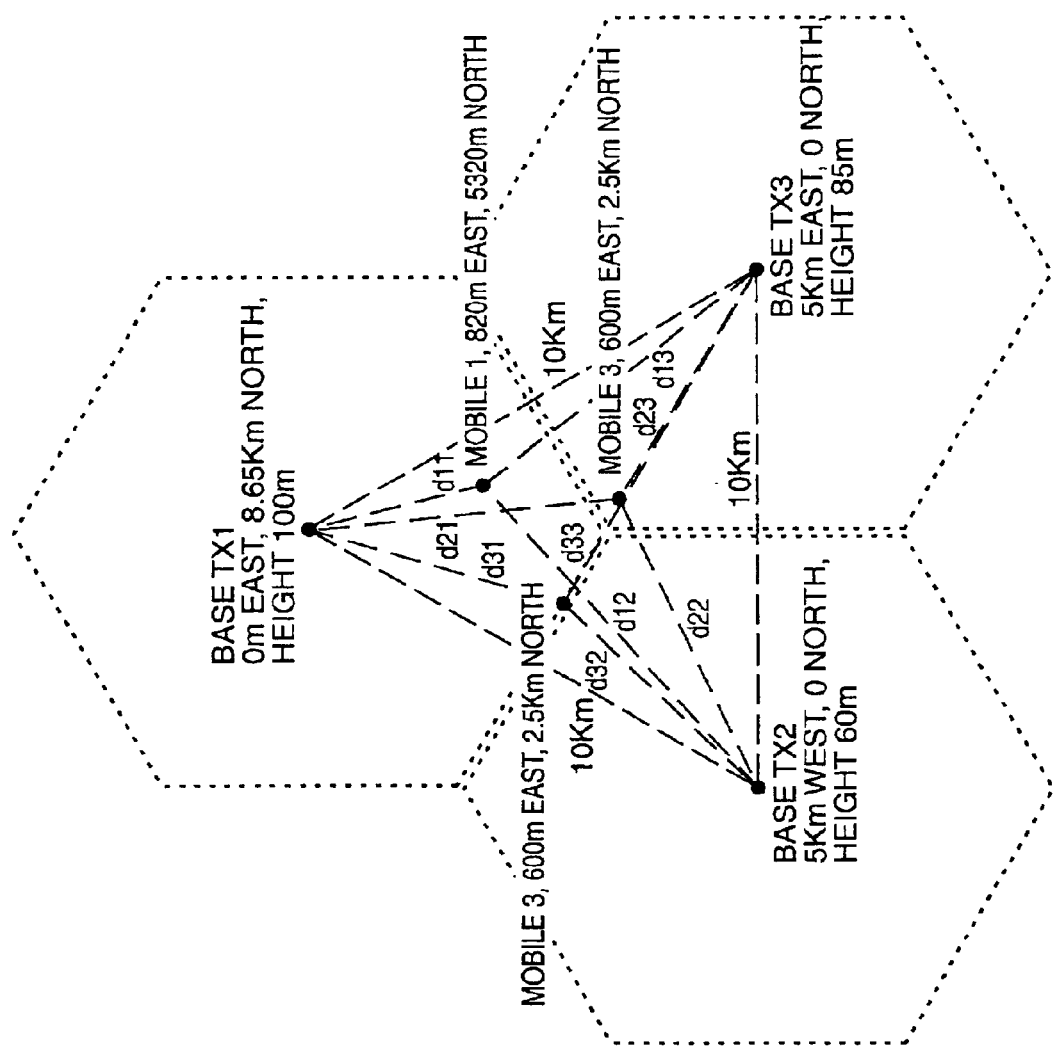
FIG. 5 is a diagram of exemplary wireless receiver grouping.

When practicing the present invention, it is desirable to group mobile terminals 16 using the same communication channel relative to a group of three neighboring base stations 12. FIG. 5 illustrates the difference between desirable and less desirable groupings. Forming group 1 as comprising the three mobile terminals 16 which are nearest to their respective base stations 12 obtains the most desirable groupings. This can be considered as producing a propagation loss matrix with the least loss along the diagonal. Then group 2 comprises the three mobiles with the second least loss to a respective one of the three base stations; while group 3 comprises the three mobiles with the third lowest loss to their respective base stations, and so on.

The least desirable groupings would comprise grouping together the three mobile terminals 16 nearest to a single base station 12, for example. The reason for favoring the former grouping method is that it obtains the highest possible wanted-to-unwanted signal ratio even without employing coherent transmit macrodiversity, such that the additional signals transmitted to cancel unwanted co-channel interference when practicing the present invention are a minimum. With the least desirable grouping, three mobile terminals 16 receive co-channel signals from the same, nearest base station 12, and the other, more distant base stations 12 must transmit at significant interference-canceling signal power due to their greater distance.

Power spectral shaping amounts to waterfilling. In the trivial case of N=1 (one antenna 14 transmitting to one mobile terminal 16), pre-compensation as above for the propagation channel at the transmitter is not optimum. In this instance, such pre-compensation would use more transmit power to transport frequency components lying in a bad frequency region of the channel having high path attenuation, and less power to transport frequency components in a low attenuation region. An optimum pre-filtering would do the reverse, transmitting most power in frequencies where the propagation is good and less power in frequencies where the propagation is bad. An optimum solution for a single transmit antenna 14 transmitting to a single mobile terminal 16 is called the "waterfilling" solution.

Waterfilling looks at the frequency response of the channel (path) and figuratively "pours" transmit signal power across frequency/attenuation curve, filling in the low points in the curve as would water poured into a container with an irregularly curved bottom. The waterfilling solution has the characteristic that no power is transmitted in regions of the spectrum where the received signal is instantaneously below a threshold signal to noise ratio. Producing a spectral null over a broad spectral region however implies high order bandstop filtering, which may be impractical or produce time dispersion in excess of the receiver equalizer's capability to compensate. The current invention avoids these disadvantages, as is made evident in the following discussion.

When received signal power varies with time instead of with frequency, i.e. so-called flat fading, conventional techniques for CDMA systems, such as IS-95, teach that rapid power control should be used to attempt to keep the received signal levels more or less constant. However, the waterfilling solution for determining how transmitted energy should be distributed over the frequency spectrum may be applied to time varying channels, showing that it is better to transmit less power when the channel is bad and more when the channel is good. Temporal waterfilling is the opposite of the conventional power control technique propounded for existing CDMA systems.

When received signal energy is a two dimensional function of both frequency and time, two-dimensional waterfilling should ideally be employed to determine the energy to be transmitted in each frequency sub-band at each instant. The principles for optimum pre-filtering according to the present invention for the multiple antenna and multiple receiver case will now be derived.

Instead of describing the propagation channels between the transmit antennas 14 and the mobile terminals 16 by z-polynomials, they may be described by frequency response functions $C_{jk}(\omega)$. The frequency response function can be obtained from the z-polynomial simply be substituting $\exp(j\omega t)$ for z or $\exp(-j\omega t)$ for $z^{-1}$. The resultant frequency response functions can be evaluated at a spot frequency to obtain a channel estimate matrix of complex numbers at each spot frequency $\omega$. This matrix of complex numbers can be inverted by computing its adjoint matrix and its determinant to form the baseband processing implemented in the numerical processor 20 to transmit that spot frequency component of each signal to respective mobile terminals 16 in an optimum manner. This can be repeated for each spot frequency component to obtain the baseband processing required for each spot frequency component, thereby determining a set of inverse frequency response functions which form a matrix for pre-processing the information signals $S_1 \ldots S_N$ to generate $T_1 \ldots T_N$ such that desired cancellation is achieved at each mobile terminal 16.

The '941 patent to Applicant, which is incorporated herein by reference, discloses a method of pre-filtering using spot frequency analysis where the number N of transmit antennas 14 exceeds the number M of mobile terminals 16. This M×N scenario is referred to as the "over-dimensioned case."

If $[C(\omega)]$ is an M×N matrix of complex numbers describing the phase and amplitude of the propagation path from each antenna k to each mobile terminal j at a spot frequency $\omega$, and $S_j(\omega)$ is the frequency component $\omega$ of the information symbol stream $S_j$ intended for mobile terminal j, then the transmit signals $T_k(\omega)$ that should be transmitted from antenna k in order to ensure that each mobile terminal 16 receives only its intended signal, while minimizing the total transmit power needed, are given by:

$$[T(\omega)] = [C]^{\#} \cdot [[C] \cdot [C]^{190}]^{-1} \cdot [S(\omega)] \quad \text{(Eq. 10)}$$

where the symbol "#" for matrices of z-polynomials means the time-reversed (end-to-end reversed) conjugate transpose of the matrix. An example of the correct way to form the time-reversed conjugate transpose of a matrix of z-polynomials is given below. Assuming an exemplary matrix, $$\begin{bmatrix} A_{11}^0 + A_{11}^1 z & A_{12}^0 + A_{12}^1 z + A_{12}^2 z^2 \\ A_{21}^0 & A_{22}^0 + A_{22}^3 z^3 \end{bmatrix} \quad \text{(Eq. 11)}$$

it is desired to find the matrix that would have the conjugate frequency response and also be the transpose. The z-polynomial matrix with the conjugate frequency response is given as, $$\begin{bmatrix} A_{11}^{0*} + A_{11}^{1*} z^{-1} & A_{12}^{0*} + A_{12}^{1*} z^{-1} + A_{12}^{2*} z^{-2} \\ A_{21}^{0*} & A_{22}^{0*} + A_{22}^{3*} z^{-3} \end{bmatrix} \quad \text{(Eq. 12)}$$

Now, to eliminate the negative powers of z in order to obtain polynomials in the same variable as the original matrix, it is necessary to multiply the whole matrix by the highest power of z in the entire matrix, in this case $z^3$. This operation results in, $$\begin{bmatrix} A_{11}^{1*} z^2 + A_{11}^{0*} z^3 & A_{12}^{2*} z + A_{12}^{1*} z^2 + A_{12}^{0*} z^3 \\ A_{21}^{0*} z^3 & A_{22}^{3*} + A_{22}^{0*} z^3 \end{bmatrix}, \quad \text{(Eq. 13)}$$

where it may be seen that the polynomials have extra powers of z as compared with merely reversing the order of the original coefficients.

Returning focus to the spot frequency analysis, by evaluating $C[C \cdot C^{\#}]^{-1}$ at each spot frequency $\omega$, a matrix of frequency response functions for transmit preprocessing is found. These frequency response functions can be converted to a set of impulse responses by finding the Fourier transform of the frequency response function if desired, so that the preprocessing of the signals $S_j$ can take place in the time domain with FIR filters. However, it is possible that, in attempting to invert $[C \cdot C^{\#}]^{-1}$ at certain spot frequencies $\omega$, it is found that its determinant is zero or near zero. This would signify one of two problem situations. There is either an unavoidable null in the frequency response of the channel from all antennas 14 to at least one of the mobile terminals 16, or that the propagation channels from each of the antennas 14 to two or more mobile terminals 16 are identical, causing the matrix to be rank-deficient.

As in the z-polynomial formulation, zeros in the determinant of a matrix may be avoided by omitting that factor, corresponding now to a zero root, from the determinant. More specifically, roots in the frequency domain that lie on or close to the imaginary axis represent "high-Q" poles and may be removed by multiplying the frequency response functions $[C \cdot C^{\#}]^{-1} C^{\#}$ with a zero term in the numerator having the same root. While this is in practice close to optimum, as in the time-domain formulation, this would result in all mobile terminals 16 experiencing the same net propagation channel, which may be non-optimum.

Instead therefore, the following procedure below is used. When the spot-frequency inverse matrix has been computed (the adjoint matrix elements and the determinant can be kept separate to avoid dividing by a zero determinant), the net spot-frequency power attenuation factor from the N transmit antennas 14, which may be considered a diversity transmitter, to each mobile terminal 16 may be computed by summing the squares of the magnitudes of the adjoint matrix elements down columns. The squared magnitude of the determinant is then divided by the column sum to obtain a net power attenuation factor from the transmitting system to the mobile terminal 16.

Repeating these two operations for all spot frequencies gives the power attenuation frequency response function from the transmitting system (the set of transmit antennas 14) to each mobile terminal 16. Now the N=1 theory can be applied to determine how an information signal $S_i$ for a given mobile terminal 16 should be pre-filtered for transmission through the associated propagation channel having that determined net power/frequency response.

Conventional theory for N=1 gives the optimum transmit power spectral shaping $P(\omega)$ for transmitting information through a propagation channel with a given power spectral shape $H(\omega)$ as "the waterfilling solution". As noted earlier, the waterfilling solution considers pouring water onto an object of shape $1/H(\omega)$ (with walls at the band edges) until the total amount of "water" contained is equal to the total power available. The function $P(\omega)$ then equals $1 - H_0/H(\omega)$ where $H_0$ is the reciprocal of the level of the water.

No power is transmitted in regions of the band still not submerged, i.e. where $H(\omega) < H_0$. The solution thus depends on the total power available relative to the receiver noise and the mean path attenuation, i.e. on the mean signal-to-noise ratio (SNR) that can be created at a given mobile terminal 16. Given a desired data rate and a channel bandwidth, the mean SNR needed to sustain that data rate can be determined, and the water-pouring solution for that SNR used.

The water-pouring solution results in zero power transmission in regions of the spectrum where the SNR is less than a threshold. It is complicated to realize a transmit pre-filter with abrupt cut-off at the boundaries of such regions, and these pre-filters moreover have long impulse responses, requiring complex equalizers in the receivers of mobile terminals 16. A compromise filter that centers single zeros of the form $1 + az^{-1}$ on the null-regions can be used instead, which is nearly equivalent to the above-proposed time-domain solution of deleting determinant polynomial roots close to the unit circle. The difference is that, in the just-described approach, the position "a" of the zeros may be adjusted slightly away from the true determinant zeros in order to flatten the net frequency response from the transmitting system to each mobile terminal 16 separately, taking account therefore of the effect of each column of adjoint matrix elements, thereby satisfying the intuitive expectation that the net channels should not turn out to be identical for each mobile terminal 16.

The frequency-domain solution and the time-domain solution are in fact identical as the matrix $C(\omega)^{\#}[C(\omega) \cdot C(\omega)^{\#}]^{-1}$ is just the matrix $C(z^{-1})^{\#}[C(z^{-1}) \cdot C(z^{-1})^{\#}]^{-1}$ with $z^{-1}$ set equal to $\exp(-j\omega t)$, where the symbol # for matrices of z-polynomials means time reversed conjugate transpose as discussed in detail above. Therefore the procedure can simply comprise determining the matrix C of z-polynomials as before, and then forming the matrix of double-length (2L) z-polynomials: $[C(z^{-1}) \cdot C(z^{-1})^{\#}]$ where # means time-reversed, conjugate transpose matrix.

The above matrix is inverted as before by computing the adjoint matrix of z-polynomials of length $2L(N-1)$ and the determinant z-polynomial (now of length $2LN$), and then multiplying the adjoint matrix by $C(z^{-1})^{\#}$ to obtain a matrix of length $(2N-1)L$ polynomials. The attenuation/frequency curve from the transmitter to each mobile terminal 16 can now be determined by letting $z=\exp(j\omega t)$ and summing down matrix columns the squares of the modules of the elements, and repeating for each spot frequency $\omega$. The square of the determinant modulus is then divided by the row sums. For each mobile terminal 16, the resulting attenuation/frequency curve may be examined to locate the highest L attenuation peaks. FIR zeros of the form $1+az^{-1}$ are then placed on the attenuation peaks to either flatten the frequency response, which is close to optimum, or to over-flatten the response by turning the peaks into troughs, which is even closer to the optimum water-pouring solution.

An approximate rule-of-thumb for over-flattening would be to choose a zero to turn a peak originally X decibels above the mean to a trough X decibels below the mean. The use of no more than L zeros ensures that the mobile terminals 16 do not need to equalize more than L symbol periods of net time dispersion. The result of applying the zeros to the signal will not however flatten the transmitter-receiver frequency response, as that is flat already when the zeros are not used; rather, it is the curve of transmit power versus frequency which is flattened across the spectrum, resulting in notches in the frequency response from the transmitting system (e.g., transmit antennas 14) to the mobile terminal 16. These notches appear to the mobile terminal 16 to have been caused by multipath propagation with a channel equal to the product of the applied "flattening" zeros.

Implementation of the above frequency-based waterfilling solution is similar to that illustrated in FIG. 2. Indeed, there are substantially no differences in implementation save that the IIR filters 30 (e.g., 30A . . . 30N) include FIR filter components composed of the above-mentioned flattening zeros, if they do not exactly annihilate factors of the determinant. Further, the FIR matrix polynomials and the IIR determinant polynomials are different owing to the different coefficient values arising from adoption of the spot frequency approach.

Note that if a determinant polynomial has a pole exactly on the unit circle, giving an infinite attenuation peak, then the pole would be annihilated by a flattening zero also exactly on the unit circle, i.e. $|a|=1$. Likewise poles close to the unit circle giving high attenuation peaks would be flattened by placing a zero nearby. If the zero was placed exactly on the pole, thereby annihilating it, the solution is identical to deleting the L poles of the determinant closest to the unit circle.

Figure 4:
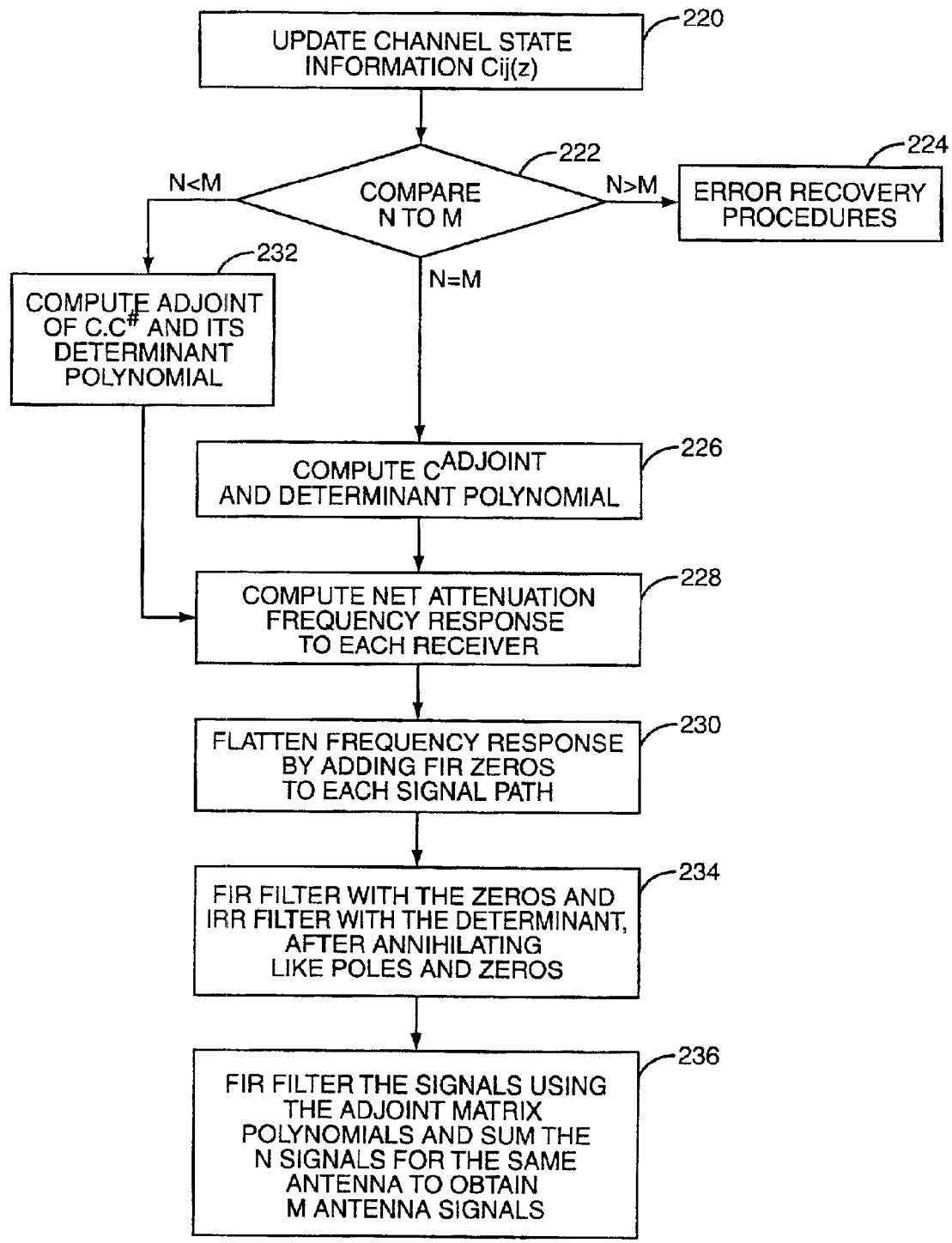
FIG. 4 is a diagram of alternate exemplary transmit signal pre-processing.

In accordance with the above waterfilling discussion, which in part adopted a frequency-based approach to polynomial determination, the flow of FIG. 3 may be modified if it is desired to perform optimum transmit spectral shaping for each mobile terminal 16. FIG. 4 illustrates this waterfilling approach.

Processing begins with updating the CSI (block 220). Once the CSI values are updated, the transmit processor 18 determines whether the network 10 is transmitting to a greater, lesser or equal number N of mobile terminals 16 compared to the number N of antennas 14 at its disposal (block 222). This test entails an evaluation of the number of mobile terminals 16 as compared to the number of transmit antennas 14 for a commonly assigned communications channel.

In some implementations, the network 10 and particularly the transmit processor 18 are not configured for transmit preprocessing when the M>N. In these implementations, M>N constitutes an error condition. Error recovery procedures (block 224) can for example comprise selecting to serve only the first N receivers and not the remaining M−N.

If N=M, the matrix C is square and it is effectively inverted by computing the adjoint matrix of polynomials of order $(N-1)L$ and the determinant polynomial of order NL (block 226). If M<N, then, as before, the extra degrees of freedom are used to optimize performance when computing the matrix $C \cdot C^{\#}$ of polynomials of length 2L (block 232). Then the adjoint matrix of this matrix is computed, as is its determinant (block 232). The adjoint matrix polynomials are of length $2L(N-1)$ and the determinant polynomial is of length 2NL.

Rather than perform the root determination and processing as in FIG. 3 (i.e., blocks 208–210), the net power attenuation as a function of frequency is computed for each mobile terminal 16 (block 228). The determined frequency response is then flattened by adding FIR zeros to each signal processing path in the transmit processor 18. More particularly, FIR zeros are added to the signal processing path of input IIR filters 30, which are applied to the input information symbol streams representing the desired information signals for the associated set of mobile terminals 16. Thus, in the flow of FIG. 4, the root determination operations of FIG. 3 (blocks 208–210) are replaced by net power attenuation determination (blocks 228–230).

The best achievable net attenuation versus frequency response from the transmitting network 10 to each mobile terminal 16 is computed (block 228). It is then desired to warp the transmit spectrum for each mobile terminal 16 to direct more power to regions of the spectrum with more favorable attenuation and that would use less transmitter power and direct less power to regions of the spectrum that suffer greater attenuation that would use more transmitter power. The water-pouring algorithm explained earlier is optimum and thus could be used here (blocks 228 and 230) if not considered too complicated.

Alternatively, the simpler approach of adding flattening or over flattening zeros can be used. In the case of high-Q determinant poles, i.e. roots very close to the unit circle, a flattening zero may be placed exactly over the pole to annihilate it. Instead of adding a zero then, a pole Is annihilated from the determinant instead (block 234). On the other hand if one of the L poles closest to the unit circle is a low-Q pole, the attenuation frequency response may not show a peak exactly on the pole frequency but will be displaced due to the influence of the adjoint matrix FIR polynomials. In that case a zero is centered on the displaced peak and does not annihilate the nearby pole (block 236).

FIG. 5 illustrates one example of the inventive method applied in a three transmitter-three receiver scenario, where the transmitting antennas 14 are relatively far apart. The three base stations 12, for simplicity, have been sited at the corners of an equilateral triangle with 10 Km sides. The three transmit sites (e.g., base stations 12 and corresponding transmit antennas 14) are jointly supporting communications with multiple mobile terminals 16, of which three are located at positions $m_1$, $m_2$ and $m_3$ as shown. It is desired to use the same communications channel (e.g., frequency time slot), simultaneously if possible, for all three mobile terminals 16 in order to increase capacity according to this invention. In this example, the base stations 12 are assumed to transmit at an exemplary symbol rate of 13 MHz/48, which is the symbol rate of a standard GSM/EDGE cellular system. Dividing the symbol rate by the speed of light yields the spatial spread, which is calculated at 1107 meters. The distances between the mobile terminals 16 and the base stations 12 expressed in terms of symbol wavelengths is shown in Table 1 below:

TABLE 1

DISTANCE FROM MTs TO BSj

|  | TX1 | TX2 | TX3 |
|---|---|---|---|
| RX1 | 3.10636 | 7.1187 | 6.10841 |
| RX2 | 5.58839 | 5.53673 | 4.56929 |
| RX3 | 4.65383 | 4.66078 | 6.67428 | where TX1 ... TX3 correspond to base stations 12A ... 12C and RX1 ... RX3 correspond to mobile terminals 16A ... 16C, as illustrated in FIG. 1.

If the channels for each of the nine paths involved in this example are of equal amplitude and phase and are all "line of sight" with no multipaths, the z-matrix relating received signals $R_1$, $R_2$, and $R_3$ to transmitted signals $T_1$, $T_2$, and $T_3$ would thus be:

$$\begin{bmatrix} z^{3.11} R_1 \\ z^{4.56} R_2 \\ z^{4.66} R_3 \end{bmatrix} = \begin{bmatrix} 1 & z^{-4} & z^{-3} \\ z^{-1} & z^{-1} & 1 \\ 1 & 1 & z^{-2} \end{bmatrix} \begin{bmatrix} T_1 \\ T_2 \\ T_3 \end{bmatrix} \quad \text{(Eq. 14)}$$

In Eq. 14, the common fractional symbol delay parts of each row and a common integer power of z have been transferred to the left into R, such that the powers of z remaining are simplified to the lowest integers, representing whole symbol periods of delay.

Maintaining the simplifying assumption of equal phase and amplitude on all nine paths, the adjoint of this matrix is:

$$\begin{bmatrix} z^{-3} - 1 & z^{-3} - z^{-6} & 0 \\ 1 - z^{-3} & z^{-2} - z^{-3} & z^{-4} - 1 \\ 0 & z^{-4} - 1 & z^{-1} - z^{-5} \end{bmatrix} \quad \text{(Eq. 15)}$$

and the determinant polynomial is $-1+z^{-3}+z^{-4}-z^{-31}$ $^7=-(1-z^{-4})(1-z^{-3})$. The determinant has all seven roots on the unit circle at:

z=1 (two roots)
z=−1
z=j
z=−j
z=exp(j120°)
z=exp(j240°)

Each root represents a frequency at which infinite attenuation can arise between the transmitting system and the mobile terminal 16, so it is inefficient to attempt to convey energy at those frequencies to the mobile terminals 16.

To avoid this problem, all seven roots on the unit circle are optionally annihilated by zeros in the numerator, which Is the same as deleting the roots of the determinant. Annihilating all seven roots could cause the equalizers in the mobile terminals 16 to have to deal with an effective channel length (delay) equal to seven symbol periods of delay—keeping in mind that not dividing by one or more factors in the determinant polynomial is the equivalent of multiplying in the numerator by those omitted factors. All the adjoint matrix elements however share at least one root with the determinant that can be annihilated. Canceling the factor $-1+z^{-1}$ from both the ad joint matrix and the determinant polynomial leaves:

$$\begin{bmatrix} (1+z^{-1}+z^{-2}) & -z^{-3}(1+z^{-1}+z^{-2}) & 0 \\ -(1+z^{-1}+z^{-2}) & -z^{-2} & (1+z^{-1}+z^{-2}+z^{-3}) \\ 0 & (1+z^{-1}+z^{-2}+z^{-3}) & -z^{-1}(1+z^{-1}+z^{-2}+z^{-3}) \end{bmatrix} \quad \text{(Eq. 16)}$$

The determinant is now being $(1-z^{-4})(1+z^{-1}+z^{-2})$. Not dividing by the 6th order reduced determinant means that the mobile terminals 16 will receive their signals modified by a 6th order FIR filter, and their equalizers must be able to deal with 7 symbol periods of delay.

The above-simplified example gave rise to many determinant roots on the unit circle due to the assumption of equal amplitude paths. If the paths are not equal, but exhibit a single propagation path of amplitude and phase given by the complex numbers $C_{jk}$, then the channel estimate matrix becomes instead:

$$\begin{bmatrix} z^{3.11} R_1 \\ z^{4.56} R_2 \\ Z^{4.66} R_3 \end{bmatrix} = \begin{bmatrix} C_{11} & C_{12} z^{-4} & C_{13} z^{-3} \\ C_{21} z^{-1} & C_{22} z^{-1} & C_{23} \\ C_{31} & C_{32} & C_{33} z^{-2} \end{bmatrix} \begin{bmatrix} T_1 \\ T_2 \\ T_3 \end{bmatrix} \quad \text{(Eq. 17)}$$

Each $C_{jk}$ in the matrix C may comprise complex numbers that are changing due to Rayleigh fading. With multipath phenomenon between the transmit antennas 14 and the mobile terminals 16, the $C_{jk}$ may be expressed as z-polynomials as in the earlier propagation path matrix examples. The additional powers of $z^{-1}$ that are now attached to the $C_{jk}$ account for the extra propagation delay due to the substantial path differences that exist in the case of widely separated transmit sites.

Figure 6:
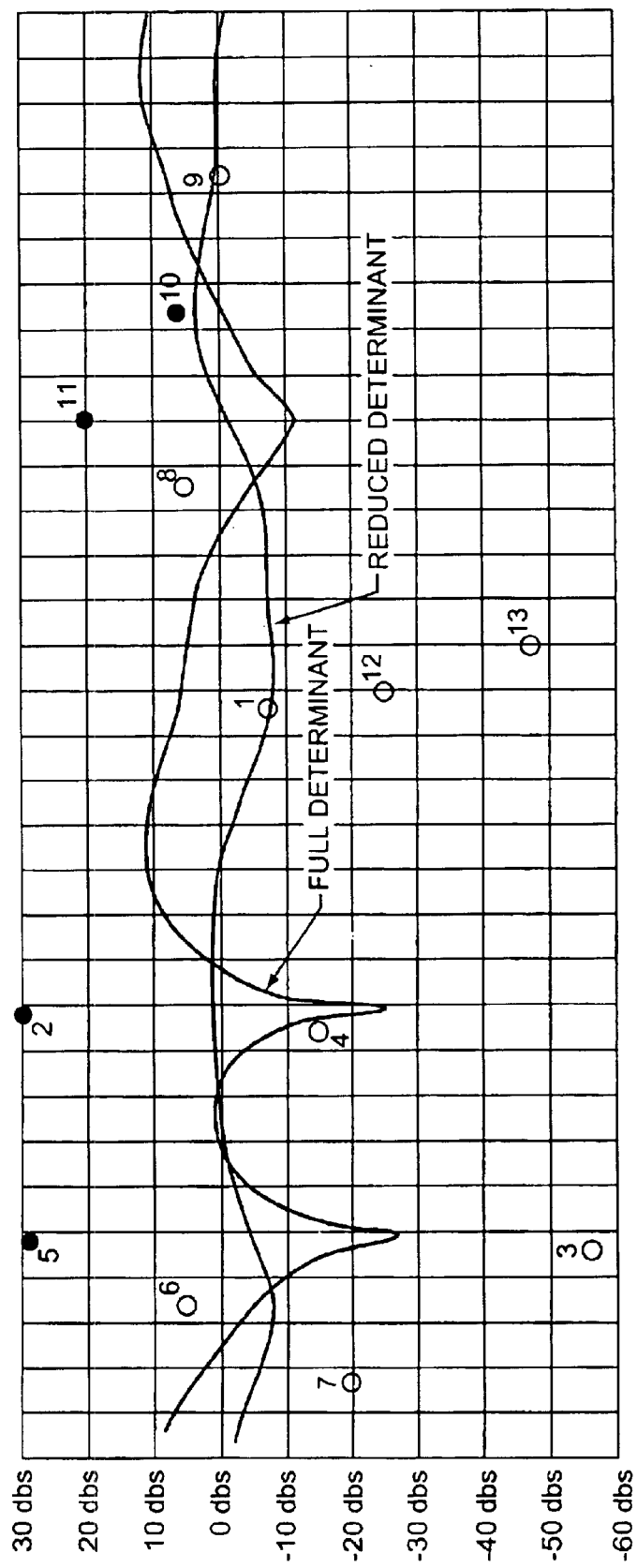
FIG. 6 is a graph of the frequency response of an exemplary channel estimate matrix determinant before and after pole deletion.

As an example, the above $C_{ij}$ were each chosen to be second order polynomials with three random Gaussian complex coefficients, representing multipath channels of three, symbol-spaced rays. A typical frequency response plot of the determinant polynomial is shown in FIG. 6.

Other trials indicated the same trend, that there were in general only three or four attenuation peaks indicative of roots close to the unit circle. Therefore in general, only three or four roots need to be deleted from the determinant. The roots can be estimated approximately from the position and depth of the attenuation peaks, but it is better to use a root finding program.

A fast algorithm which iteratively finds all roots at the same time of a polynomial A(z) is given below. Since $a(z)=(z-R1)(z-R2) \ldots (z-R(i)) \ldots (z-Rn)$, then $$z-R(i)=A(z)/[\text{product of all factors except } (z-R(i))] \quad \text{(Eq. 18)}$$

Substituting the current approximation for the root z=R'(i), obtain $$dR(i)=A(R'(i))/[\text{product of all factors } (R'(i)-R'(j)) \text{ except } i=j] \quad \text{(Eq. 19)}$$

The corrected root is then R'(i)−dR(i). It can be desirable to move the approximation only a fraction ALPHA towards the above value, where ALPHA starts small when the initial approximation is bad, and increases to unity. It is also desirable to continue the iteration for several cycles after convergence where the lease significant bits are undergoing a limit cycle due to rounding errors, remembering the solution for which the largest error was a minimum. A test for convergence is that the largest error, i.e., the largest value of A(R'(i)) over all roots (which should all ideally be zero) reduces from cycle to cycle. If it increases, then the limit cycle due to rounding error has been reached.

Repeating the above sequentially for i=1 to n and then iterating, exhibits rapid convergence from substantially arbitrary starting points to the desired roots and "polishes" their final values to high accuracy.

The FORTRAN subroutine below implements the algorithm.

---

SUBROUTINE CROOT (A, NA, ROOTS)

```
C program to find the NA complex roots ROOTS (1) to ROOTS (NA)
C of the polynomial A(1)Z**NA+A(2) z**(NA-1) . . . +A(NA) Z
A(NA+1)
C where A(1) is normalized to unity.
      COMPLEX A(*), ROOTS (*), BEST(100), X, DR, POLVAL
      X=CMPLX (0.9, 8.0*ATAN(1.0)/FLOAT(NA))
C scatter some starting values about
      DO 1 I=1, NA
      ROOTS (I)=X**I
    1 CONTINUE
      ALPHA=1.0E-6
      ELAST=1.0E19
      KOUNT=2-
   98 ALPHA=SQRT (ALPHA)
      WORST=0.0
      DO 3 I=1, NA
      X=CMPLX (1.01, 0.0)
      DO 4 J=1, NA
      IF (J.NE.I)X=X*(ROOTS(I)-ROOTS(J))
    4 CONTINUE
C calculate the error from zero when a root is substituted
C and divide by the product of the other factors to get
correction
      DR=POLVAL (A.ROOTS (I).NA)/X
      IF (WORST.LT.CABS (DR)) WORST=CABS (DR)
C correct the root
      ROOTS (I)=ROOTS (I)-ALPHA*DR
    3 CONTINUE
C if the worst error is worse than the best solution so far
C then start a count down of 20 final polishing iterations
      IF (WORST.GE.ELAST) THEN
      KOUNT=KOUNT-1
      IF (KOUNT.EQ.0)GO TO 97
      GO TO 98
      ELSE
C if the worst error is still improving over last time
C then save the best root estimates so far
      KOUNT=20
      ELAST=WORST
      DO 5 I=1, NA
      BEST (I)=ROOTS (I)
    5 CONTINUE
      GO TO 98
      ENDIF
```

---

SUBROUTINE CROOT (A, NA, ROOTS)

```
   97 DO 6 I=1, NA
      ROOTS (I)=BEST (I)
    6 CONTINUE
      RETURN
      END
```

---

FIG. 6 plots the determinant polynomial and the flattened polynomial obtained by deleting the four roots closest to the unit circle. The coefficients of the example polynomial are given in Table 2 below:

TABLE 2

COEFFICIENTS OF POLYNOMIALS

| COEFFICIENT | REAL | IMAG |
|---|---|---|
| A(1) | −0.01492 | 0.01770 |
| A(2) | 0.01484 | −0.02824 |
| A(3) | 0.02419 | −0.08202 |
| A(4) | 0.00808 | −0.01929 |
| A(5) | −0.04147 | −0.15490 |
| A(6) | 0.36312 | 0.11521 |
| A(7) | 0.44006 | 0.19125 |
| A(8) | 0.58783 | 0.88261 |
| A(9) | 0.22755 | 0.01047 |
| A(10) | 0.33422 | 1.09935 |
| A(11) | 0.22015 | −0.36053 |
| A(12) | −0.67517 | 0.61808 |
| A(13) | 0.15489 | −0.26555 |
| A(14) | −0.12943 | −0.13633 |

The roots in Z of the above polynomial were found by the above computer analysis to be:

TABLE 3

ROOTS OF POLYNOMIALS

| | REAL | IMAG | \|LOGMAGNI-TUDE\| | |
|---|---|---|---|---|
| ROOT(1) | 0.62535 | −0.07880 | 0.46157 | |
| ROOT(2) | 0.35251 | 0.94711 | 0.01053 | DELETE |
| ROOT(3) | −0.21019 | 0.26791 | 1.07728 | |
| ROOT(4) | 0.47505 | 1.68848 | 0.56192 | |
| ROOT(5) | −0.57159 | 0.79850 | 0.01816 | DELETE |
| ROOT(6) | −1.07257 | 0.84329 | 0.31070 | |
| ROOT(7) | −1.76889 | 0.60238 | 0.62521 | |
| ROOT(8) | 0.34753 | −0.64730 | 0.30831 | |
| ROOT(9) | −1.10402 | −0.95889 | 0.38001 | |
| ROOT(10) | −0.34591 | −1.29541 | 0.29327 | DELETE |
| ROOT(11) | 0.22513 | −1.10904 | 0.12369 | DELETE |
| ROOT(12) | 1.95558 | −0.38249 | 0.68946 | |
| ROOT(13) | 2.43781 | −0.97210 | 0.96488 | |

The four roots of magnitude closest to unity were determined by comparing the values of ABS(REAL(CLOG (ROOT(I)))), where the complex logarithm function UCLOG returns a real part equal to the logmagnitude. Thus, the preceding expression returns the absolute value of the real portion equal to the logmagnitude of the complex value. The roots with the smallest absolute value of this logmagnitude are ROOT(5), ROOT(2), ROOT(11) and ROOT(10) and were deleted to produce the flattened curve of the reduced determinant.

The adjoint matrix polynomials before dividing by the reduced determinant have the nine frequency responses shown in FIG. 7A. When the reduced determinant is used as the denominator and the adjoint matrix polynomials are used in the numerator to obtain the nine-filter transmit preconditioning used in the transmit processor 18, the nine frequency responses of FIG. 7B are obtained. When combined with the actual propagation paths between transmit antennas 14 and mobile terminals 16, these responses contrive jointly to ensure that each mobile terminal 16 receives only its own intended signal through an effective channel comprised of the product of the four deleted determinant factors. Due to selecting the deleted roots to be those closest to the unit circle, this effective channel comprises four rays that are exactly symbol spaced and contain the maximum possible energy.

The nine frequency responses of FIG. 7B can also be combined in threes by adding their power responses to determine how much power in total is being used to transmit to each mobile terminal 16, as shown in FIG. 7C. The integral of the power spectral curves yields the total power used for transmitting the intended signals to each mobile terminal 16. These powers can be compared to the powers that would have been necessary to communicate the same total signal power to one mobile terminal 16 at a time from the best base station 12 with the same channel state to obtain the comparative gain or loss for the macrodiversity network 10. In the above case, the results were:

Mobile 1: +4.46 dB more power needed (a loss)
Mobile 2: +0.98 dB more power needed (a loss)
Mobile 3: +2.50 dB more power needed (a loss)

The net loss is less than appears, because the mobile terminals 16 that are relatively nearer their supporting base stations 12 receive the significantly increased power while those further away receive smaller power increases.

Figure 8A:
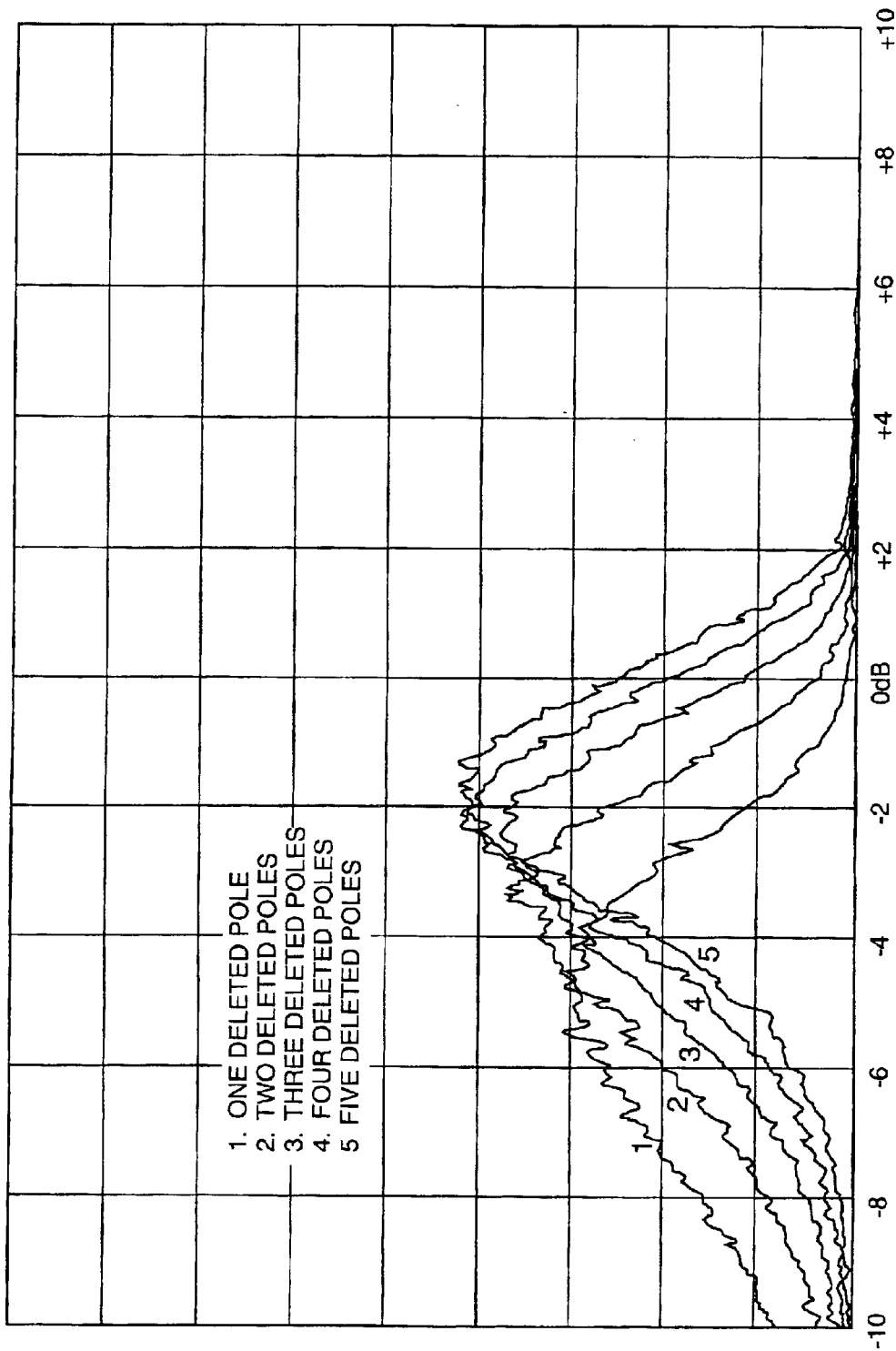
FIG. 8A is a graph of net power gain/loss for one through five deleted determinant poles for an exemplary three receiver/three transmitter configuration.
Figure 8B:
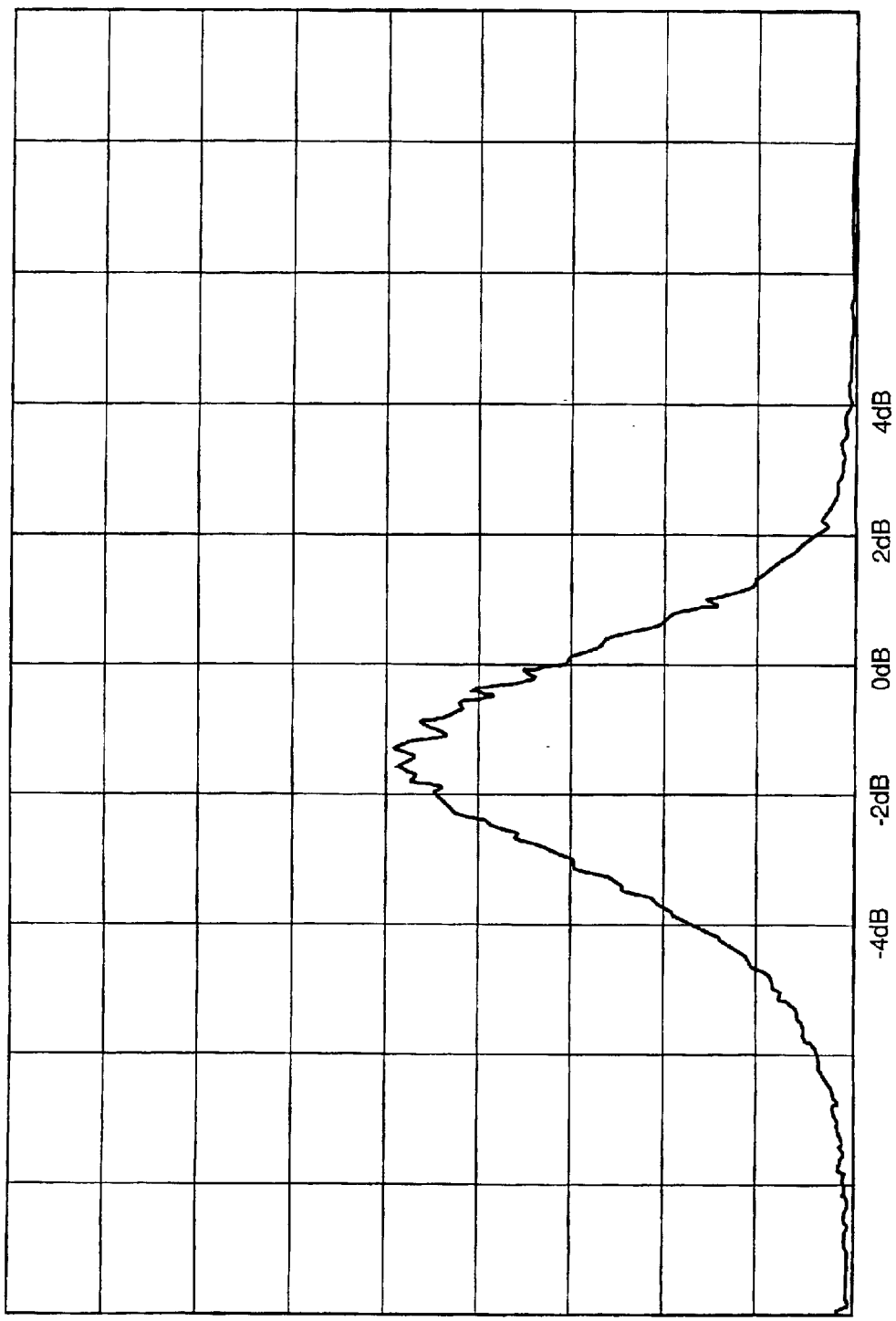
FIG. 8B is a gain/loss histogram associated with FIG. 8A for an optimal number of deleted determinant poles.

After carrying out many trials using random propagation channels each comprising the exemplary three, symbol-spaced, delayed multipath rays, a histogram was obtained of the total transmitter power used compared to the transmitter power that would have been used for each base station 12 talking to one mobile terminal 16 independently, ignoring mutual interference. FIG. 8A shows the histograms of gain/loss for this three-by-three system, with the different curves corresponding respectively to the deletion of one, two, three, four, or five poles from the determinant. FIG. 8B shows the gain/loss histogram for the case where the number of poles deleted was selected in each trial to provided maximum communications efficiency. The mean loss in the three-by-three case is about 1.5 dB in this case, for which the benefit of a tripling in capacity is obtained. It will be shown below that overprovision of base station transmitters in relation to mobile terminals 16 can turn this net power loss into a net power gain.

An implementation of the present invention can comprise deleting only those determinant polynomial roots with absolute logmagnitude less than a threshold, and thus not always the maximum number that the various mobile terminal equalizers can handle, with the intention of approximating the performance of FIG. 8B for deleting the optimum number of roots. For example, the logmagnitude of a root of the determinant may be compared to a threshold to determine whether to delete the root. The logmagnitude of a root of the determinant polynomial indicates the rate of decay of the impulse response due to the associated root, in Nepers per symbol period. It could be decided that it is unnecessary to delete roots representing greater than 3 dB (0.35 Nepers) decay per symbol period, for example. If only three roots had logmagnitudes less than 0.35, then only those need be deleted.

Other strategies for slating determinant poles for deletion other than selecting the poles nearest to the unit circle can also be used. If for example the adjoint matrix polynomials in the same column all have a factor equal to or close to a determinant factor, then it is unnecessary to delete that determinant factor since it cancels with the same factor in the numerator. Likewise, when the numerators contain a zero close to an offending pole, they reduce the undesirable effect of the offending pole. A systematic approach to detecting and exploiting such occurrences to select the poles for deletion to obtain the best effect is desired. One such systematic approach is provided using Cauchy's residue theorem. Cauchy's residue theorem potentially provides a much faster method to determine the total power transmitted when a "white" signal input is filtered by one or more numerator (FIR) z-polynomials and a denominator (IIR) polynomial to obtain the transmit signals (e.g., the signals transmitted by antennas 14).

Oftentimes it is desired to compute the total power output from a filter driven at its input with a serially uncorrelated (white) sample or symbol stream. This is the same computation as determining the noise bandwidth of a receiver filter. The expression to be computed is:

$$\int_{-B/2}^{+B/2} \frac{|N(f)|^2}{|D(f)|^2} df \qquad \text{(Eq. 20)}$$

If this value is needed in real time during signal processing for example, it is too cumbersome to compute the integral by summing many points across the frequency domain. When the filter is a discrete time filter with an FIR numerator polynomial N(z) and a denominator D(z) representing an IIR filter, the integral is the same with z set equal to EXP(−j2π.f/B). The variable of integration may be changed from f to z by using z=exp(−j2π.F/B), therefore df=−B dz/z 2j π. The limits of integration will now be from +π, to −π, i.e. going around the unit circle backwards. To change to the forward direction, drop the minus sign obtaining the following contour integral:

$$\frac{B}{2\pi j} \int_{-\pi}^{+\pi} \frac{|N(z)|^2}{|D(z)|^2} \frac{dz}{z} \qquad \text{(Eq. 21)}$$

Cauchy's residue theorem says that such integrals may be computed as the sum of residues at the poles. However, attempts to apply Cauchy's residue theorem to expressions containing such squared terms will fail to give the right answer, as the | |² function does not meet the requirement of analyticity that Cauchy's theorem requires. However, the modulus function can be converted to an analytic form that is valid on the unit circle contour of integration as follows:

Assume N(z) and D(z) are polynomials with roots P and corresponding factors such as (z−P).

Then $|z - P|^2 = (z - P)(z^* - P^*)$ $= (z - P)(1/z - P^*) \rightarrow$ valid only for this contour integration $= -P(z - P)(z - 1/P^*)/z$ Therefore every root of the N(z) polynomial gives rise to a factor 1/z and every root of the denominator D(z) gives rise to a factor z on the numerator. If the order of the numerator is greater or equal to the order of the denominator, there would be net addition on the denominator of some power of z which would give rise to residues at z=0 in addition to those from D(z). If on the other hand the numerator order is at least one less than the denominator (one less because we already have dz/z), then there are no powers of z on the denominator to cause the need to consider additional residues.

With this assumption Np>Nz therefore, we can write the integral as, $$\frac{B}{2\pi j \prod(-p_i)} \int \frac{\prod_{i=1}^{Nz}(z-q_i)(1/z-q_i^*)}{\prod_{i=1}^{Np}(z-p_i)(z-1/p_i^*)} z^{Np-l} dz \quad \text{(Eq. 22)}$$

The analytic form of the numerator, which is valid on the contour of integration, must be used rather than just staying with $|N(z)|^2$, as when the value of a pole is substituted to get the residue, the results are quite different. $|N(z)|$ is always real and positive, while the analytic form is complex. The latter is necessary to ensure that the result of the integral turns out to be real and positive, which it would not always be if $|N(z)|^2$ were used.

Cauchy's theorem now says that the value of the above integral is $2j\pi$ times the sum of the residues at the poles within the contour of integration. Now either $p_i$ or $1/p_i^*$ will lie within the unit circle. Therefore one residue arises from each pole, which is the result of substituting either $z=p_i$, or $z=1/p_i^*$ in the integrand, after deleting the corresponding factor (which becomes zero) in the denominator. The result is, $$\frac{B}{\prod(-p_i)} \sum_{k=1}^{Np} \frac{\prod_{i \neq k}(p_k-q_i)(1/p_k-q_i^*)}{(p_k-1/p_k^*)\prod_{i \neq k}(p_k-p_i)(p_k-1/p_i^*)} p_k^{Np-1}, \quad \text{(Eq. 23)}$$

assuming that we have switched $p_i$ with $1/p_i^*$ where the former was outside the unit circle in order to obtain a set of $p_i$'s all within the unit circle.

This expression will always yield a real, positive result as required, and the values have been confirmed to be the same as obtained by laborious point-by-point integration along the frequency axis. Moreover, by examining the amount contributed by each pole residue to the real part of the result, we can associate a corresponding proportion of the total spectral energy with each pole, which is useful in determining optimum filters in some signal processing problems. The above may be computed without finding the roots of the numerator. The product of the numerator factors $(p_k-q_i)$ is simply $N(p_k)$. The product of the factors $(1/p_k-q_i^*)$ is $N^*(1/p_k^*)$.

The method outlined above may be extended by those skilled in the art using the same principles to cover all practical cases. Thus, a version of Cauchy's residue theorem is developed for integrating the modulus squared of a complex numerator frequency function divided by a complex denominator frequency function. In the case where the numerator is a z-polynomial at least one order less than the denominator z-polynomial, the result is a sum of terms, each corresponding to the contribution from a respective denominator pole. If the numerator is small at that pole, then the contribution (the residue at the pole) to the total power integral will be low. Therefore the systematic method desired above is to select for deletion poles that have the largest real part to their residues, including the numerator term when computing the residues.

It can be argued that the selection process should first select the pole having the largest real part to its residue for deletion, and then re-evaluate the residues of the remaining poles having deleted the pole. This process should continue until the desired number of poles have been deleted. The remaining denominator order must be at least one higher than the numerator order. If the process shall be continued to denominators of lower order, then an extra residue appears due extra powers of z on the denominator.

The extra residue can be determined by making a partial fraction expansion to extract a term having that power of z on the denominator, the other term now having a numerator of lower order than the denominator. The extra residue is then equal to the coefficient of the highest power of z in the numerator above the extracted term. The extra term is needed to determine the power after deleting a pole causing the numerator order to equal or exceed the denominator order.

In the application to this invention, the numerator can comprise the sum of the moduli of all the adjoint matrix polynomials down a column, where the modulus of a z-polynomial means the product of itself with its time-reversed conjugate. The residue at a pole therefore comprises a part from each adjoint matrix numerator polynomial, so only if all adjoint matrix polynomials in the same column are small at the denominator pole with that pole have a small residue, and thus avoid being slated for deletion.

In light of the above discussion, it is evident that maintaining current CSI is useful in generating the appropriate filter coefficients used by the transmit processor 18. This may entail periodically updating or modifying the channel estimate matrix C. Updating the CSI requires continuously updated knowledge of the downlink channel conditions between the various transmit antennas 14 and mobile terminals 16. Many different approaches are available for obtaining the needed downlink channel information, and some of these approaches are discussed below for illustration.

Possible approaches to obtaining CSI include but are not limited to these items:

(i) Using the same channel frequency for both the downlink and uplink (from the mobile terminals 16 to the base stations 12) channels alternately in quick succession, thus implementing a so-called time-duplex or ping-pong system. Then the transmitting base stations 12 may assume that the downlink channels are the same as they measure on the uplink when decoding the signals received back from the mobile terminals 16.

(ii) Measuring downlink channel-related information in the receivers at the mobile terminals 16, and then transmitting these measurements back to the network 10 with a small turnaround delay. For example, the Universal Mobile Telecommunications System (UMTS) Wideband CDMA system (W-CDMA) has the ability to serve up to 200 voice users per frequency channel per cell, or a proportionally lower number of high bit-rate users such as mobile web-browsers. Therefore, for mobile web-browsers desirous of receiving a high instantaneous data rate, it is acceptable to use the whole capacity of a voice channel or more on the uplink to feedback CSI-related data.

(iii) Determining relative mobile terminal position in a mobile satellite communications system, where the relative coupling from transmit antenna elements to mobile terminals 16 is almost static.

(iv) Implementing a wireless-in-the-local-loop system for transmitting Internet or voice services wirelessly to the home, where the receive antenna is fixed.

(v) Implementing a mobile system wherein the mobile terminal 16 is likely to be stationary when high bitrate services are invoked.

The above approaches can all provide feedback of CSI, but the case of fast-moving mobile terminals 16 is the most challenging as the CSI changes rapidly, and low-delay, high-rate feedback of CSI is required. Some solutions for rapid feedback of changing CSI will now be described.

In a "loopback" approach, let C' denote the current CSI assumed by the transmitting system (e.g., network 10), which is in error from the correct CSI C by an error matrix E so that in matrix equation form:

$$[C']=[C]+[E], \text{ or conversely } [C]=[C']-[E]. \quad \text{(Eq. 24)}$$

The transmitter (antenna $T_k$) transmits $[C']^{-1}P_jS_j$, where $P_j$ is the effective net channel for signal $S_j$. $P_j$ is the factor by which pre-filters 30A, 30B, . . . and 30N of FIG. 2 differ from the true determinant polynomial.

Reciever R receives $$R(i)=[C]_{ij}[C']_{kj}^{-1}P_jS_j, \quad \text{(Eq. 25)}$$

where summation over the common index k is implied. The above expression reduces as follows:

$$=[C'-E]_{ik}[C']_{kj}^{-1}P_jS_j, \quad \text{(Eq. 26)}$$

$$=P_jS_i-[E]_{ik}[C']_{kj}^{-1}P_jS_j, \quad \text{(Eq. 27)}$$

since $[C']_{ik}[C']_{kj}^{-1}=d^{ij^{-1}}$ if i=j, else 0.

Thus a given mobile terminal 16 as receiver R correlates its received signal R(i) with known symbols embedded in the transmission $S_j$ to receivers) (e.g., another of the mobile terminals 16), the error polynomial term $[E]_{ik}[C']_{kj}^{-1}P_j$ summed over index k will be obtained.

If all mobile terminals 16 do this for all j, including their own, and return the results to the network 10, the channel estimator 36 can compute $E_{ij}$ and hence correct $C'_{ij}$ towards the actual or changing $C_{ij}$, thereby tracking changes in the CSI. This is possible because the channel estimator 36 already knows or has access to the $S_j$ it transmitted, the prefilters $P_j$ it used, and the assumed CSI represented by $C'_{ij}$.

From these interference correlations, the channel estimator 36 deduces how its CSI must have been in error, and corrects it. Specifically, receiver $R_1$ reports the polynomials determined by correlation with shifts of respective known symbol patterns as follows:

$$X_{11}(z) = P_1 - \text{sigma}(E_{1k}C_{k1}^{-1})P_1 \quad \text{(Eq. 28)}$$
$$X_{12}(z) = -\text{sigma}(E_{1k}C_{k2}^{-1})P_2$$
$$\vdots \qquad \vdots$$
$$X_{1N}(z) = -\text{sigma}(E_{1k}C_{kN}^{-1})P_N$$

This is a set of N equations for the N unknown polynomials $E_{11}, E_{12}, E_{13} \ldots E_{1N}$. Likewise, receiver $R_2$ reports, $$X_{21}(z) = -\text{sigma}(E_{2k}C_{k1}^{-1})P_1 \quad \text{(Eq. 29)}$$
$$X_{22}(z) = P_2 - \text{sigma}(E_{2k}C_{k2}^{-1})P_2$$
$$\vdots \qquad \vdots$$
$$X_{2N}(z) = -\text{sigma}(E_{2k}C_{kN}^{-1})P_N$$

and this is a set of N equations for the N unknown polynomials $E_{21}, E_{22}, E_{23} \ldots E_{2N}$. Similarly, receiver $R_N$ reports $$X_{N1}(z) = -\text{sigma}(E_{Nk}C_{k1}^{-1})P_1 \quad \text{(Eq. 30)}$$
$$X_{N2}(z) = -\text{sigma}(E_{Nk}C_{k2}^{-1})P_2$$
$$X_{NN}(z) = -\text{sigma}(E_{Nk}C_{kN}^{-1})P_N,$$

which represents a set of equations for $E_{N1}, E_{N2} \ldots E_{NN}$.

The solution of each of such sets of equations for one row of [E] is $[C][P^{-1}] \cdot X$, where $[P^{-1}]$ is a diagonal matrix of the reciprocals of the prefilters used in the numerical processor 20. If the reported measurements X were exact, the X polynomials would contain P as a factor, which would cancel. The remaining factors would give a solution for E that was entirely FIR, i.e. no denominator polynomials, as required.

However, due to noise, the reported X polynomials probably will not have this exact property. A solution is to find the pure FIR solution of order L for E that best matches the frequency responses given by Equation 25 for E. For example, denominator roots from P can be paired with the closest numerator roots from C or X for annihilation until only numerator roots remain. These then yield the "best" pure FIR solution for E.

Figure 9:
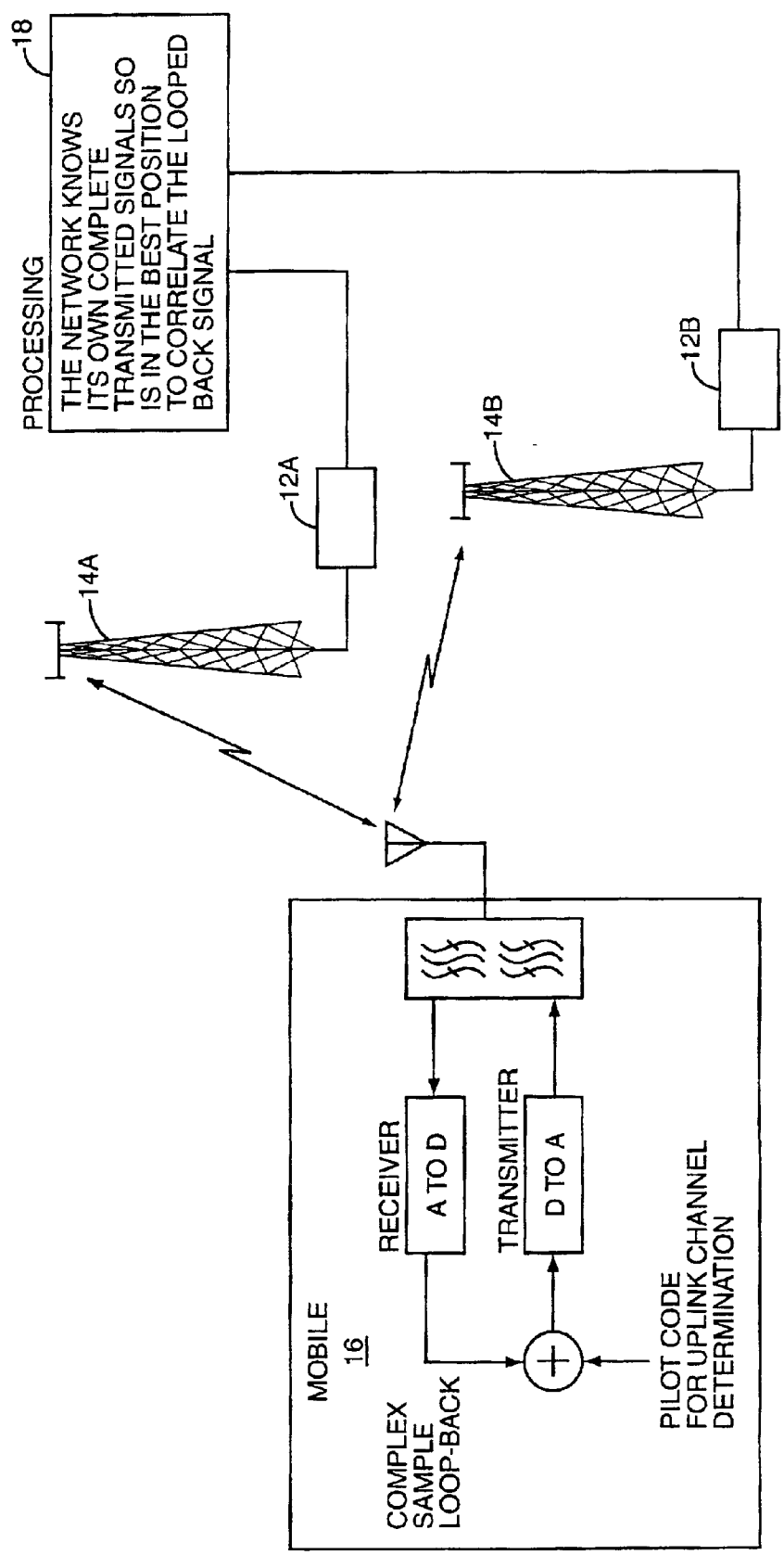
FIG. 9 is a diagram of exemplary loop back signal provisions in a wireless receiver operating in the network of FIG. 1.

FIG. 9 shows another method for providing channel state feedback from the mobile terminals 16 to the network 10. Here the transmit processor 18 additionally performs mobile terminal feedback correlation operations. For simplicity, only two base station/antenna sites are depicted (i.e., 12A/14A and 12B/14B). As before, the mobile terminal 16 receives transmit signals $T_1$ and $T_2$ from the transmit antennas 14A and 14B, respectively.

In an exemplary, simplified arrangement, the mobile terminal 16 comprises a transmit/receive antenna 101 coupled via a duplexer 102 to receive circuits 103 which filter, amplify and convert the composite received signal to signal samples, preferably in digital form, i.e. using an A-to-D converter. The signal samples from the receiver 103 are then added in summer 105 to a pilot code and fed to transmitter circuits 104. The transmitter circuits 104 convert the signal samples to an continuous signal using a D-to-A converter for digital samples, and the continuous signal is up-converted to a transmit frequency, amplified to an appropriate transmit power level, and transmitted via antenna 101 back to the transmitting base stations 12.

The base stations 12 receive the transmitted loop-back signal from various mobile terminals 16. The loopback signals from different mobile terminals 16 may be separated by interference rejection combining of the signals from the different sites in the channel estimator 36. Also, the channel estimator 36 computes correlations between the received signals and the pilot code inserted by a mobile terminal 16 to determine the uplink channel. Correlations are also computed between the received signal from a mobile terminal 16 and the signals the network 10 transmitted from each of its sites in order to determine the total loopback channel, which is the product of the downlink and uplink channels.

The uplink channel is then divided out to reveal the downlink channel. If necessary, the network sites (e.g., BTSs 12) can also each add a different, low-level pilot code to their transmissions, which would be chosen to assist in this loopback channel determination. Using this method, the mobile terminals 16 are relieved of the complexity of performing channel determination.

Generally, it is desirable to simplify mobile terminals 16 due to their high production volumes, and place complexity instead in the networks 10, which are much less numerous. Thus a simplified method by which the mobile terminals 16 can feedback downlink channel information to the transmitting network 10 would be useful. For example, the signal received at each mobile terminal 16 could be simply turned around and retransmitted with minimum delay back to the network, as shown already in FIG. 9.

If all mobile terminals 16 do so on the same channel, the network 10 must separate them by uplink beamforming/interference cancellation, which implies knowledge of uplink CSI. Uplink CSI is also needed to divide out the effect of the uplink channel polynomials on the retransmitted signal so that it reflects only the effect of the downlink channel.

In a CDMA system, the mobile terminals 16 can retransmit the signal received on the downlink with the addition of an uncorrelated pilot code sequence that the channel estimator 36 can use to derive uplink CSI. In a non-CDMA system that would not tolerate an overlapping pilot sequence, the feedback signal can instead be periodically interrupted at known times to insert pilot symbols that the network 10 can use to derive uplink CSI. Thereby the onus for analyzing what the mobile terminals 16 have received is placed back on the network 10.

The network 10 has the great advantage of knowing every symbol that was transmitted to every mobile terminal 16 and what prefilters (e.g., 30 and 32) were used in the generation of all the transmit signals. The network 10 can therefore perform correlations using the entire symbol sequence, or a portion thereof, transmitted to each mobile terminal 16, including data symbols and not just known pilot symbols.

Thus a modification to FIG. 9 can comprise interrupting the loopback signal to insert pilot symbols, replacing the additive combination of pilot and loopback signals formed by adder 105. In general, any suitable combination of the loopback signals with mobile-specific pilot symbols or mobile-discriminating information can be used.

Many variations of the above principle of "mirror reflection" of the received signals back to the network 10 can be devised. For example in a CDMA system, the received signal at each mobile terminal 16 can be despread using the codes of each mobile terminal 16 to obtain despread symbols. Then, the despread symbols can be respread using corresponding uplink codes and added. The multi-code uplink signal is then mirrored from each mobile terminal 16 to the network 10.

Interference correlations (the X polynomials in the above notation—see 24–26 for example) can also be digitally coded of course, and transmitted as a data stream protected by error correction coding. For high symbol rates giving long channel polynomials (large L) or for large N (e.g., greater than 3) the amount of digital information to be transmitted may exceed the uplink capacity available, presumed to be for example the capacity of one voice channel, or about 4 to 12 kilobits per second.

The information to be sent to the network 10 could be selectively reduced by including in the reports only the X polynomial or polynomials having the greatest coefficient magnitudes, including only polynomial coefficients that had changed by more than a threshold amount from a predicted value, or by some other means of down-selecting.

Reporting only the coefficient with the greatest magnitude will cause the network 10 to correct its transmitted signals to reduce only that largest interference component. However, if this action is repeated sequentially, it will reduce multiple interference components in order of strongest components first.

The mathematics given above include the derivation of the optimum transmit signals when the number of transmit antennas 14 exceeds the number of mobile terminals 16. With such over-dimensioning, more degrees of freedom exist to find a way of overcoming fading on any particular path, and/or of canceling interference at each mobile terminal 16. This should translate to fewer problematic or pathological determinant roots close to the unit circle, and therefore to greater transmit power efficiency. To obtain the benefits of over-dimensioning it is only necessary for the number of independently fading paths of the same delay to be greater than the number of mobile terminals 16.

For meeting this criterion, mean delay from an additional base station 12 can always be made the same as the delay from existing base stations 12 artificially, which occurs automatically when the above-described mathematical operations are performed (e.g., Right Hand Circular and Left Hand Circular). However, this criterion can also be met by providing dual polarization transmitters at one or more base stations. Field measurements confirm that the propagation channel for a transmitted wave of one polarization reaching a mobile terminal 16 over a landmobile propagation path shows little correlation to the propagation channel of the other, orthogonally polarized wave. Thus if each base station 12 and antenna 14 are equipped to transmit power with both polarizations, each base station 12 counts as two independent base stations 12 as regards the mathematical formulation, even though the RHC and LHC transmitters are co-located.

Figure 10:
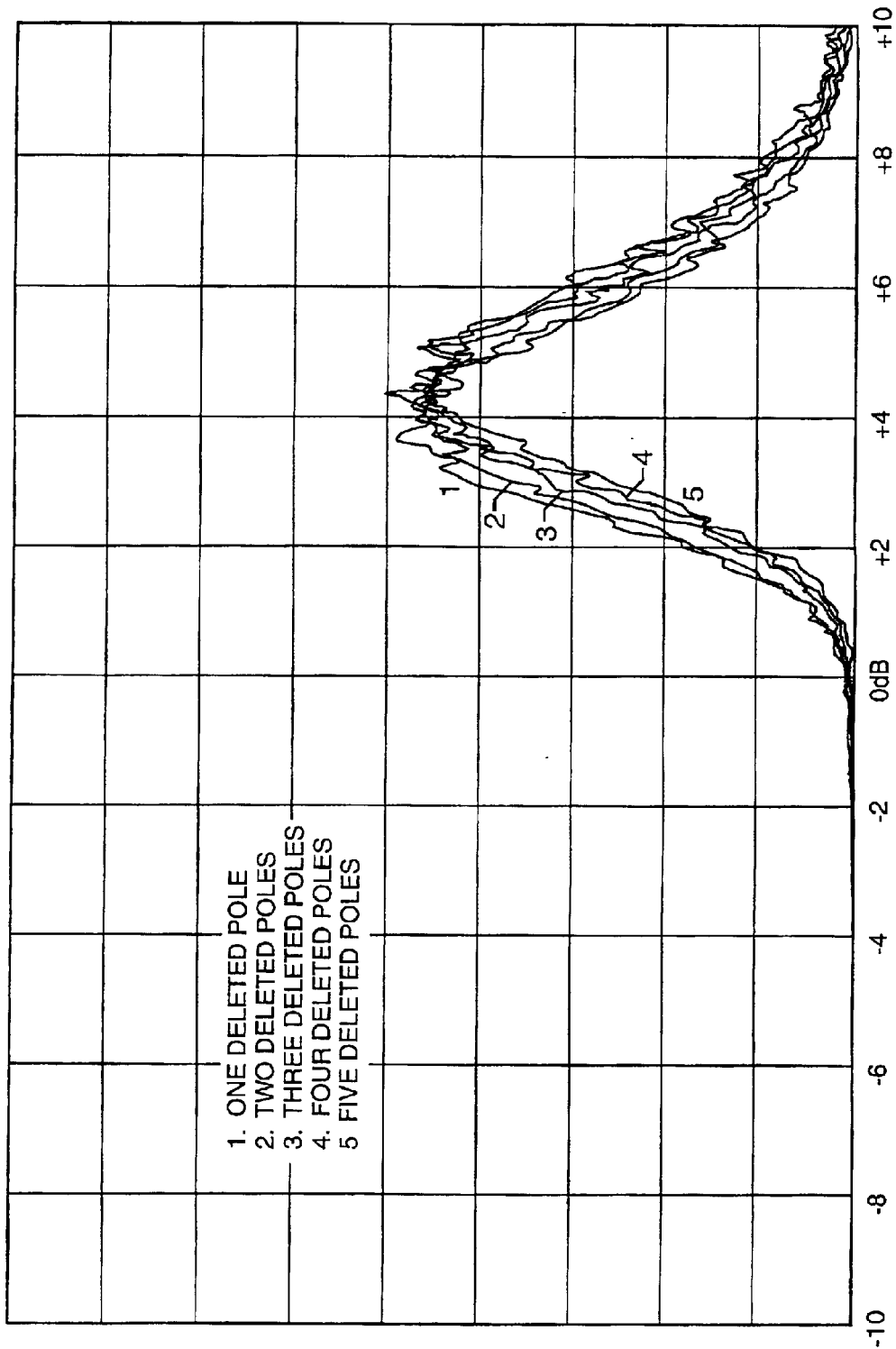
FIG. 10 is a gain/loss histogram for one through five deleted determinant poles in a three receiver/three dual-polarization transmitter configuration.

FIG. 10 shows a gain/loss histogram computed from many trials of a 3-base/3-mobile system wherein each base station is equipped to transmit dual polarized signals. The channel estimate matrix is then a 3×6 matrix of polynomials, and the transmit processor 18 computes six waveforms to be transmitted from respective antennas 14 and with respective polarizations, based on the three information signals to be transmitted to respective mobile terminals 16.

The different curves again correspond to the deletion of one, two, three, four, or five of the "worst" determinant poles, and now show a net gain in total power efficiency of 4 to 4.5 dB in the mean. That means the sum of the power transmitted at all three sites and in both polarizations can be significantly less than needed in conventional systems not using the invention at the same time as allowing the same communication channel to be reused three times at each location. Moreover, the effect of using both polarizations to thereby overdimension the number of transmitters relative to the number of receivers is to virtually eliminate determinant poles close to the unit circle, so no determinant poles need be deleted. If no determinant poles are deleted, then the network 10 provides a constant net propagation channel for information signals from the network 10 to the mobile terminals 16, which is free of fading and multipath distortion.

Another aspect of transmit macrodiversity considers a degenerate case of the N-antenna, M-receiver solution using two antennas 14, for example two co-located RHC and LHC transmitting antennas 14, to transmit a signal to a single mobile terminal 16. When the two antennas 14 are co-located and differ only by polarization, the channel coefficients for the multipath channels are substantially uncorrelated for the two polarizations; however, the delays of the fading, multipath rays are the same. That is, if the channel for RHC is expressible as, $$C^{RHC}(z) = C_0^{RHC} + C_1^{RHC} z^{-P_1} + C_2^{RHC} z^{-P_2}. \quad \text{(Eq. 31)}$$

then the LHC channel is expressible as, $$C^{LHC}(z) = C_0^{LHC} + C_1^{LHC} z^{-P_1} + C_2^{LHC} z^{-P_2}. \quad \text{(Eq. 32)}$$

The powers of z are the same for both polarizations, expressing equality of the multipath delays, but the coefficients are different and fade in an uncorrelated fashion.

The optimum way to transmit a wanted signal to the mobile terminal 16 is then given as in the earlier discussion of unwanted signal cancellation by $C^{\#}[C \cdot C^{\#}]^{-1}$ times the wanted signal waveform, where C is now the 2×1 matrix of polynomials, $$C = \begin{pmatrix} C^{RHC} \\ C^{LHC} \end{pmatrix}.$$

Thus $[C \cdot C^{\#}]^{-1} = 1/(C^{RHC} \cdot C^{\#RHC} + C^{LHC} \cdot C^{\#LHC})$ and there is no implementation then depends only on the location of the poles of this denominator/determinant polynomial. It may be appreciated that, when P1 and P2 are large integers, this determinant has a prodigious number of roots even though it has a small number of coefficients.

The above channels, which have three significant multipaths of relative delays 0, P1 and P2 symbol periods, are typical of a CDMA channel. A known CDMA receiver, such as might be found in some implementation of mobile terminals 16, would conventionally employ a form of multipath equalizer known as a RAKE receiver.

Figure 11:
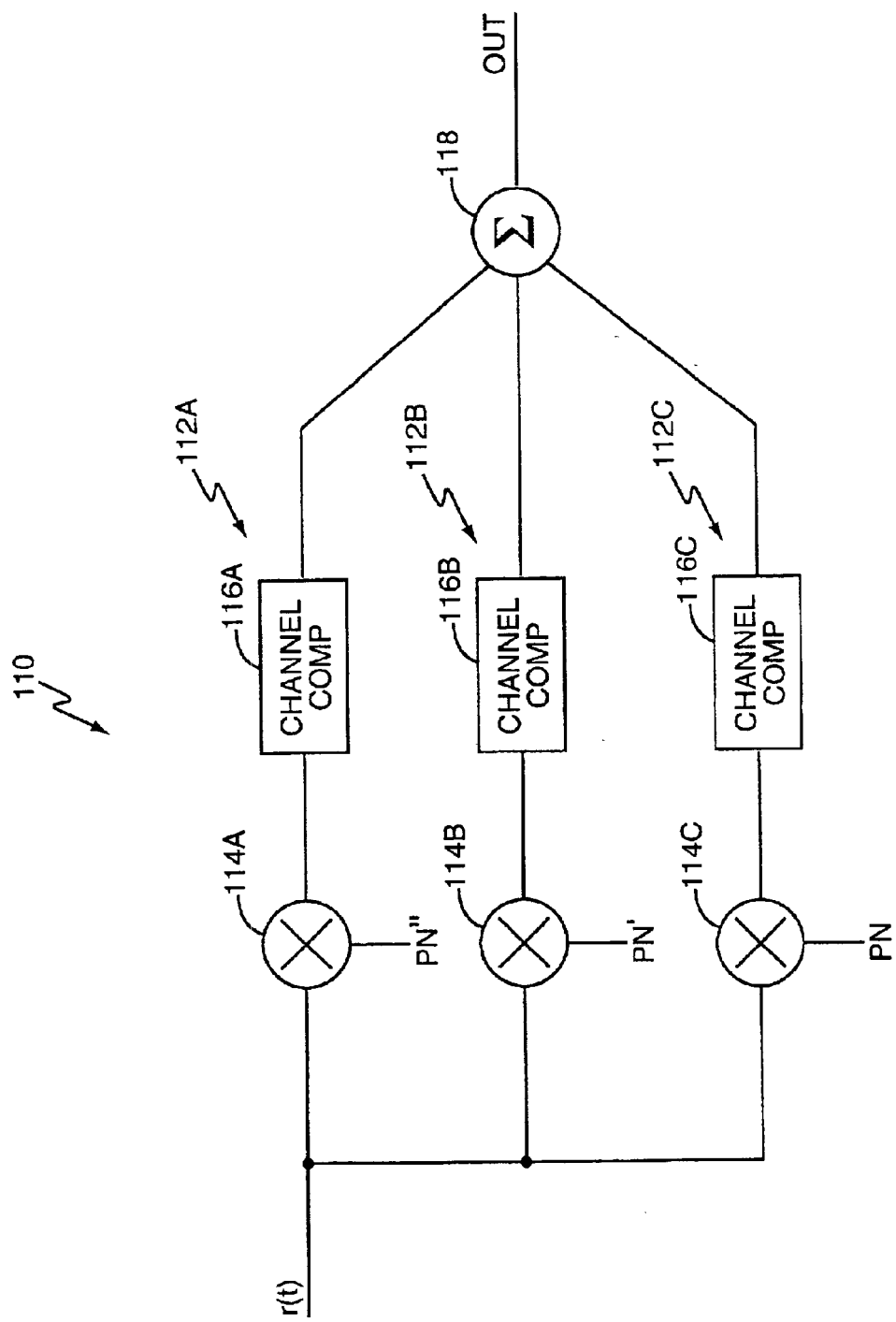
FIG. 11 is a diagram of an exemplary RAKE receiver as might be used in some configurations of the wireless receivers in FIG. 1.

FIG. 11 depicts an exemplary RAKE receiver 110 as might be employed within a mobile terminal 16. It comprises three RAKE fingers or "taps" 112A, 112B, and 112C, with each finger including a correlator 114 and channel compensator 116. The outputs from each finger 112 are coherently combined in the summing circuit 118.

While not essential to understanding the coherent transmit macrodiversity techniques of the present invention, it may be helpful to review the basic operation of the RAKE receiver 110. The received signal r(t) comprises the entirety of information streams for all mobile terminals 16 operating on the same communications channel as the given mobile terminal 16. By correlating r(t) with its uniquely assigned psuedo-noise (PN) sequence, the receiver 110 recovers only its intended information stream from r(t).

Because r(t) generally comprises multipath components, each having a determinable delay or offset, the receiver 110 can time-align each of its fingers 112 to a given one of the multipath signals. One technique for synchronizing multipaths is to control the code offset of the PN code fed to each finger 112. While each finger 112 receives the same PN code sequence, the code offset of the sequence received by a given finger 112 is matched to the relative path delay of the multipath signal operated on by that finger 112. The differing code offsets are denoted as PN, PN', and PN" in the illustration and correspond to relative symbol delays of 0, P1, and P2, respectively.

Each multipath component of the received signal experiences channel distortions unique to its associated propagation path, so each finger includes a channel compensator 116 to compensate for path attenuation and phase characteristics of the propagation path. After channel compensation, the finger outputs are coherently combined in combiner 118 to produce an overall RAKE output signal. In this manner, the signal-to-noise-ratio (SNR) of the received signal may actually be improved with multipath since the final output signal is a combination of the RAKE-received multipath components.

Thus, the RAKE taps 112 in the present example are placed at delays of 0, P1 and P2 symbols or chips. The RAKE receiver 110 is not limited so much by the amounts P1, P2 of delay, but in the total number of taps 112.

Conventionally, RAKE receivers do not include a substantial number of taps owing to the understandable desire to limit complexity and expense, as well as the "diminishing return" aspects of adding more than a basic complement of taps. A three-tap RAKE receiver represents a common configuration and it is desirable that the coherent transmit macrodiversity techniques of the present invention be amenable to use with mobile terminals 16 that include such three-tap RAKE receivers.

Recall from earlier discussion that the path delay requirements for receivers within the mobile terminals 16 is affected by the number of determinant polynomial roots used or omitted in the IIR filtering performed in the transmit processor (e.g., pre-filters 30). In the extreme, omitting the whole of the above determinant polynomial would result in a net transmission channel having seven delays and needing in principle a seven tap RAKE receiver with tap delays of −P2, −P1, −(P2−P1), 0, (P2−P1), P1 and P2 chip periods.

If the already-described pole-deletion procedure is used to improve the conditioning of the denominator for implementation, only two roots may be deleted while preserving only a 3-tap channel for the RAKE receiver 110 to deal with. Moreover, the three-tap channel would always comprise delays of exactly 0, 1 and 2 chips with this method. Thus the three RAKE taps 112 would be adjacent instead of at 0, P1 and P2 symbols delay. However, as noted, RAKE receivers 110 are generally limited only in the number of taps available to combine, and not in tap spacing. Therefore any three-coefficient numerator polynomial of the form $$A_0 + A_1 z^{Q_1} + A_2 z^{Q_2} \tag{Eq. 33}$$

could be used as an FIR prefilter 34 in the transmit processor 18, and would preferably share roots with the denominator that it is desired to cancel. Alternatively, a polynomial in which most of the energy was contained in three taps could be used.

A denominator polynomial of the form $C_1(z)C_1^{\#}(z) + C_2(z)C_2^{\#}(z) + \ldots$ has the property that half of its roots are the conjugate reciprocals of the other half. Those roots having magnitude greater than unity (and which would therefore require time-reverse IIR processing) may be slated for deletion. The remaining poles form a causal IIR filter (e.g., filters 32) that may be implemented entirely by forward-time processing, and the deleted poles give rise to a net FIR channel.

This is one way of factoring the denominator polynomial into the form $C_{equ}(z)C_{equ}^{\#}(z)$, which factoring is always possible by selecting one root to form $C_{equ}$ and its conjugate reciprocal to form $C_{equ}^{\#}$. The choice of the larger or smaller root for $C_{equ}$ can be made in $2^{N/2}$ different ways, given N/2 pairs of roots, so the number of such factorizations that can be made is large.

Trial computations showed that factoring into a purely causal and a purely anti-causal part gives a channel that, although not limited to the same number of taps as the original channels $C_1$ and $C_2$, nevertheless contains most of its energy in relatively few coefficients, allowing a RAKE receiver 110 with a small number of taps 112 to be used. When fewer taps are used than the number of multipaths containing signal energy, a loss of energy is entailed.

Figure 12:
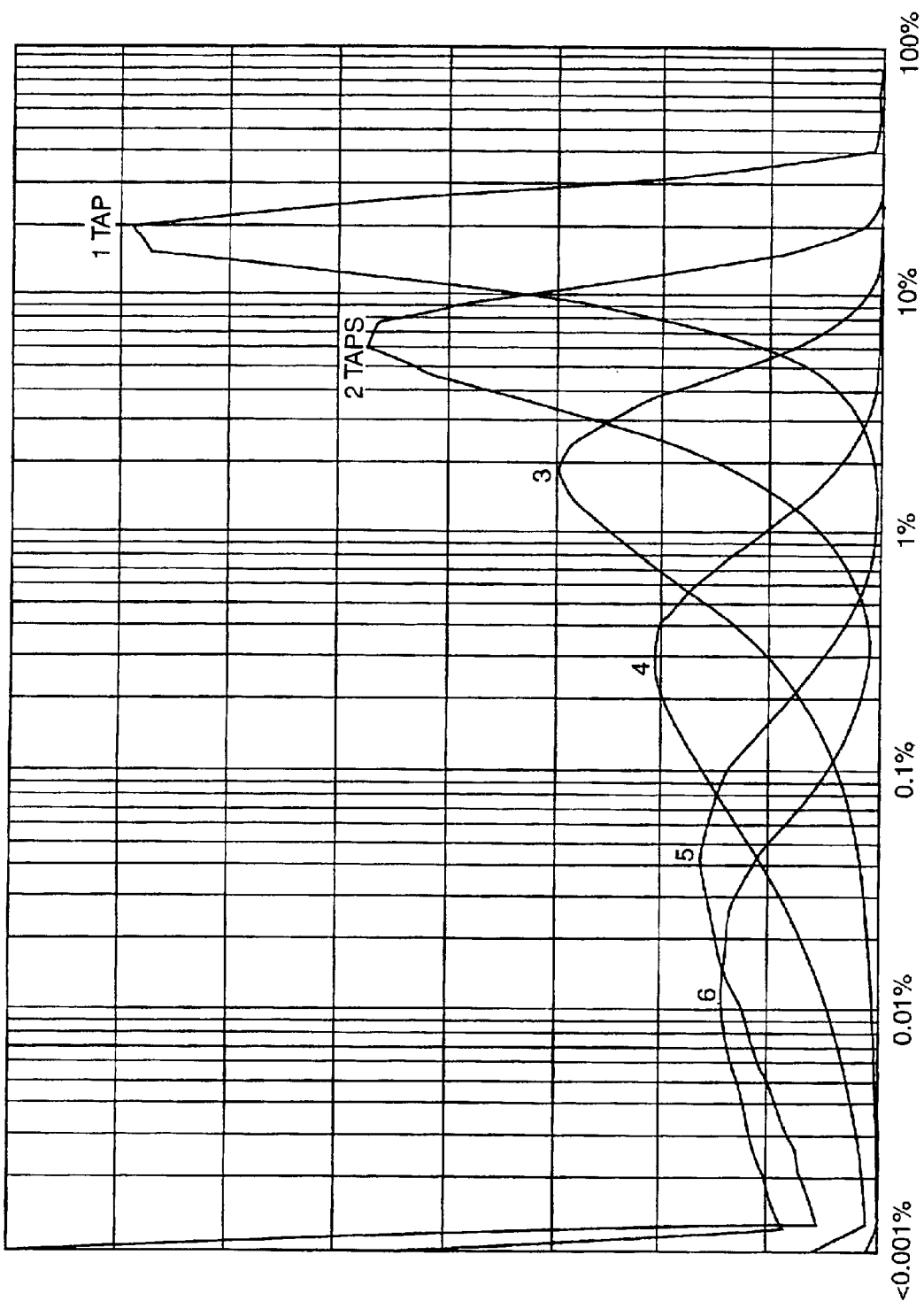
FIG. 12 is a graph of the probability distribution of the energy lost in restricting the number of RAKE taps in the receiver of FIG. 11.

FIG. 12 plots the probability distribution function (PDF) of this energy loss for using one to six taps 112 to receive the signal through the above-mentioned anti-causal factor. The RHC and LHC channels were both of the form $C_0 + C_1 z^5 + C_2 z^{13}$ and thus the determinant is of order 26. The causal and anti-causal factors are then both of order 13, but do not have non-zero z-powers of only 5 and 13. Nevertheless, 80% of the energy is most often contained in the tap delay 14, 93% is contained in tap delay 14 and tap delay 9 and 98% is most often contained in tap delays 14, 9 and 1. Thus, a RAKE receiver 110 with no greater than an ordinary number of taps 112 is suitable for use in a network 10 employing the coherent transmit macrodiversity techniques of the present invention.

Figure 13:
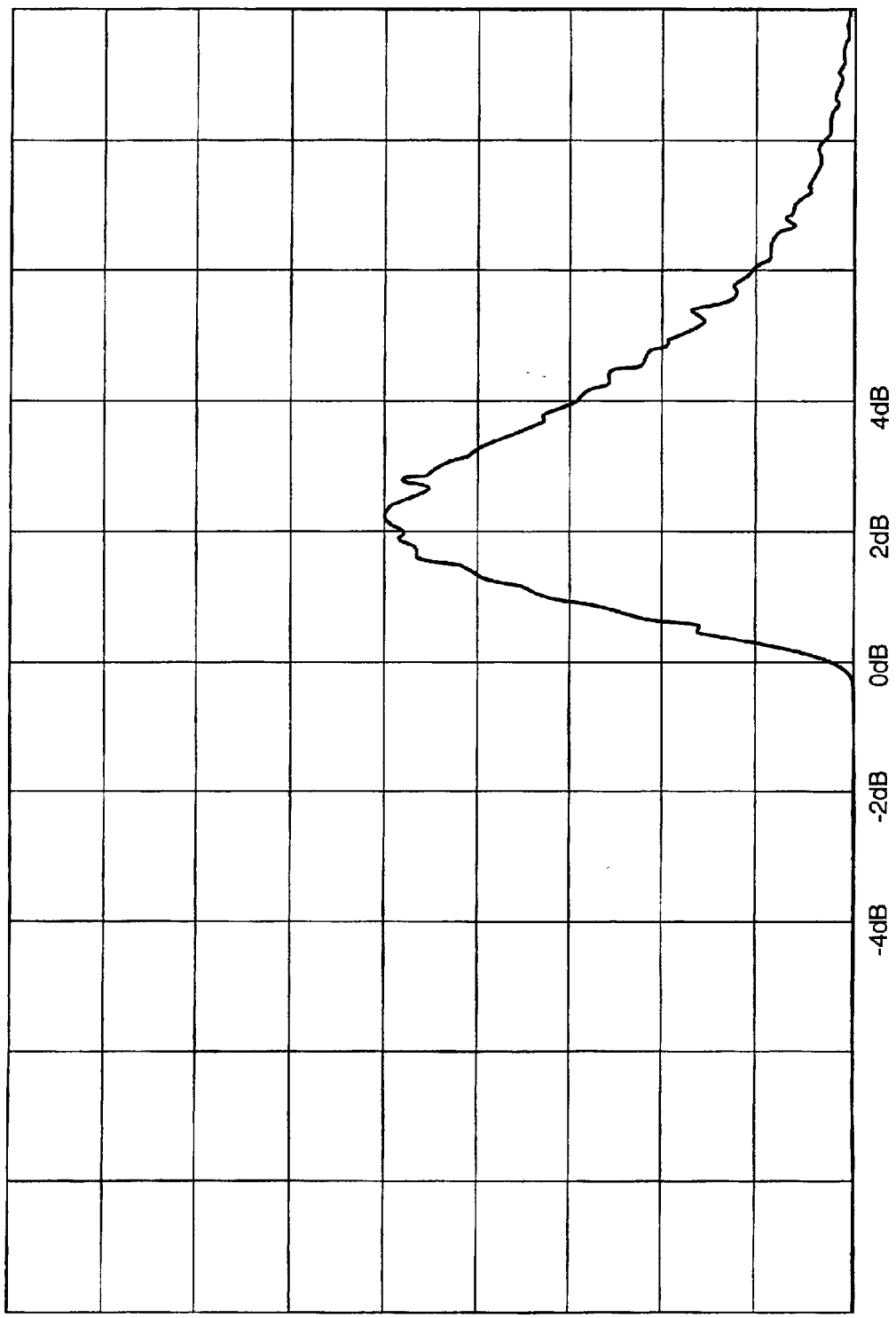
FIG. 13 is a graph of the probability distribution of the gain for coherent polarization diversity in a three-tap RAKE receiver.

FIG. 13 plots a histogram of the net gain in communications efficiency for this method, when the number of RAKE taps 112 is fixed at three, the same as the number of multipaths in the multipath channels. The gain of 2 dB equates to a 60% increase in communications capacity in terms of number of users or data rate when practicing coherent transmit macrodiversity in accordance with the present invention.

Figure 14:
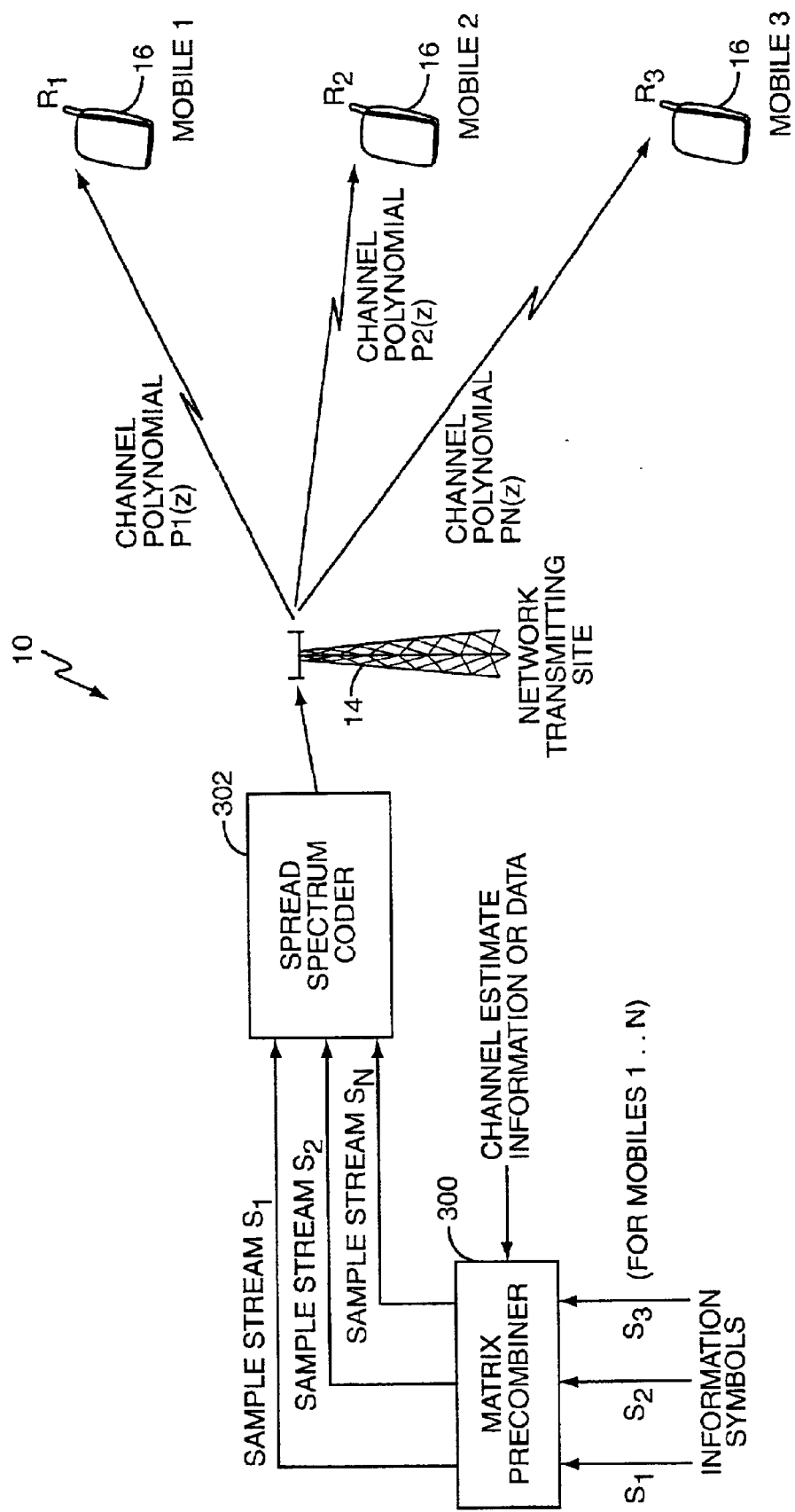
FIG. 14 is a diagram of an alternate embodiment of the present invention, which is exemplary for use in CDMA-based wireless networks.

FIG. 14 shows another application of the invention to a CDMA system. The simplified network 10 comprises a matrix precombiner 300 and a spread spectrum coder 302. The matrix precombiner 300 is used in this implementation much like the earlier example based on the transmit processor 18.

In this example, only a single transmit antenna 14 of a single polarization is available to transmit to N mobile terminals 16. The signal to each mobile terminal 16 is spread-spectrum coded using a unique spreading code, and the set of spreading codes may be mutually orthogonal, at least when the codes are time-aligned. When the codes are not time-aligned, such codes will show some degree of correlation or mutual interference.

A conventional CDMA system lacks the precombiner 300 and simply comprises inputting symbol streams $S_1 \ldots S_N$ to spread spectrum encoder 302, where $S_i$ is the coded information stream intended for a particular mobile terminal 16. Stream $S_i$ is multiplied with spreading code $PN_i$ and transmitted to mobile terminal 16 through a propagation channel described by downlink channel polynomial $P_i(z)$.

The ith mobile terminal 16, denoted as mi, where i is an index, correlates the received signal with a first shift of code $PN_i$ and obtains $P_0(i)S_i$ where $P_0(i)$ is the first coefficient of the propagation polynomial $P_i(z)$ and likewise obtains $P_i(i)S_i$ for other code shifts. These are then RAKE combined into a single sample stream whose dominant component is then, hopefully, $Q_{0ii}S_i$ where $Q_{0ii}=|P_0|^2+|P_1|^2 \ldots |P_{L-1}|^2$ and L is the length (e.g., number of paths or delay spread) of the downlink channel to mobile(i).

However, the combined RAKE output signal will contain other, undesirable terms.

There will be some intersymbol interference (ISI) from the previous and the next symbol of stream $S_i$ due to correlation of the spreading code PN(i) shifted with itself. If the channel time dispersion is less than one information symbol in duration however, only one previous and one future symbol will contribute to the RAKE output. This an be accounted for by coefficients $Q_{-1}$ and $Q_{+1}$ of a 3-coefficient z-polynomial $Q_{ii}(z)$ and the combined RAKE output can be written as $Q_{ii}(z)-S_i(z)$.

In addition, there are correlations between spreading code $PN_1$ of a first mobile terminal $M_1$ and code $PN_2$ of second mobile terminal $M_2$ shifted, which give terms $Q_{ij}(z)S_j(z)$. The order of $Q_{ij}$ may, as already seen in the above simplified example, be extended when signal $S_j$ is received from a transmit antenna 14 lying at a greater or lesser distance from mobile terminal $M_1$, but not when all signals are received from the same transmit antenna 14.

Thus all $Q_{ij}$ in this example have three coefficients. This matrix of z-polynomials describes the coupling from other mobile terminals' intended information symbols to a given mobile terminals' RAKE output from its RAKE receiver 110. Conventional networks 10 do not work to prevent these undesirable terms in each mobile terminal's RAKE output. With regard to this aspect of the present invention, pre-compensation of the transmit signal within the matrix pre-combiner 301 operates to cancel the unwanted signals at each mobile terminal 16. Particularly, transmit pre-processing works to cancel ISI at each mobile terminal 16 that is caused by the signals intended for the other mobile terminals 16.

The matrix of z-polynomials used by the matrix precombiner 301 may be inverted as before by forming the adjoint matrix and the determinant polynomial. If the determinant polynomial has no unpleasant roots, then using the inverted matrix in the precombiner 300 cancels all interference at the RAKE receiver output of each mobile terminal 16 caused by both other mobile's symbols and from that mobile's own previous and future symbols.

If unpleasant roots of the determinant polynomial have to be deleted, and the remaining, reduced determinant used as the IIR part of precombiner 300, then all interference from other mobiles' signals will still be cancelled, but there will be a net multipath channel created from the product of the omitted determinant factors through which each mobile terminal 16 will receive its intended symbol stream.

This can be completely compensated at the mobile terminals 16 by following the RAKE combiner 18 in the mobile terminals' RAKE receivers 110 with a 3-tap, Viterbi Maximum Likelihood Sequence Estimator (not shown) or other known form of symbol-spaced equalizer running only at the information symbol rate and not at the spread spectrum chip rate.

Thus, FIG. 14 contemplates the addition of an information-rate matrix precombiner 300 to combine information symbol streams $S_1, S_2 \ldots S_n$ to form information-rate sample streams $S_1, S_2 \ldots S_N$, which are input to the spread spectrum coder 302.

The precombiner 300 has a structure similar to that of the numerical processor 20 in the transmit processor 18, as shown in FIG. 2. The polynomials used in precombiner 300 are computed using knowledge both of the downlink channels $P_i(z)$ and of the cross-correlations between and the autocorrelations of the different spreading codes used in coder 302, and using the assumption that the mobile terminals 16 employ conventional RAKE combining with weighting coefficients adapted to the chip-level channel impulse responses (i.e., the attenuation and phase characteristics of the multipath channels).

Figure 15:
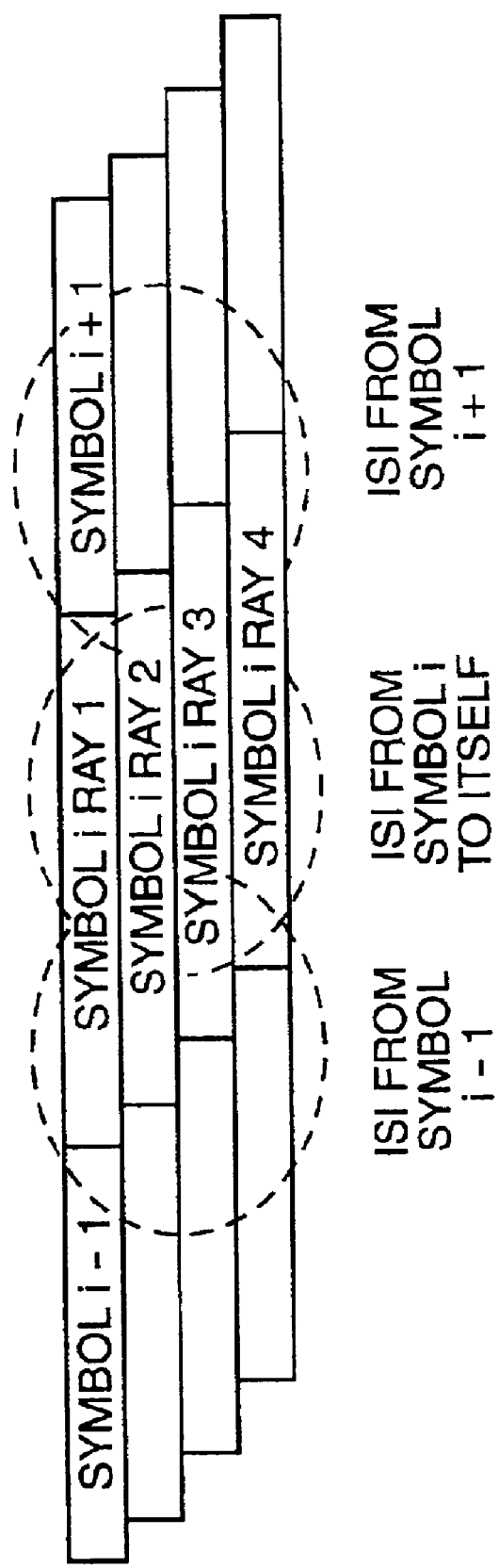
FIG. 15 is a diagram of Inter-Symbol Interference (ISI) in a CDMA signal.

In the discussion immediately above, the matrix C included cross-correlation interference between the different information signals being transmitted to the receivers, and may be thought of as a coupling or interference matrix Cij. FIG. 15 illustrates how a rake output sample depends typically on three adjacent symbols, due to delayed multi-path rays. When the sample corresponding to symbol (i) is calculated by the rake receiver, it first correlates the received signal with the chip sequence used to spread symbol (i), with the chip sequence aligned in time with ray 1 to obtain a value U1, then with the chip sequence time aligned with ray 2, ray 3, ray 4 . . . to obtain values U2, U3, U4 . . . correspondingly. Correlation means multiplying each received chip sample by the complex conjugate of the spreading code symbol, and summing over the number of chips used to spread the symbol to obtain each U-value. The U-values are then weighted by the complex conjugates of the separately estimated channel coefficients C1, C2, C3, C4 . . . for rays 1 . . . 4, giving the rake receiver output R(i) as $$R(i)=C1^{\#}U1+C2^{\#}U2+C3^{\#}U3+C4^{\#}U4 \quad \text{(Eq. 34)}$$

However, as may be seen from FIG. 16a, when correlating with the chip sequence time-aligned with ray 1, there is an overlap with the end of the chip sequence for symbol (i−1) due to delayed rays 2, 3 and 4, so that there is a contribution to U1 from symbol (i−1). This contribution is $$S(i-1)[C2.p2+C3.p3+C4.p4] \quad \text{(Eq. 35)}$$

where p2 is the partial correlation between the left-hand end of the chip sequence for symbol i and the overlap with the right-hand end of the chip sequence for symbol (i−1) due to delayed ray 2; p3 is the partial correlation of the chip sequence for symbol i for the slightly greater overlap with the end of the chip sequence for symbol (i−1) due to delayed ray 3, and so on.

Likewise, U2 has a contribution from S(i−1) due to delayed rays 3 and 4 of $$S(i-1)[C3.p2+C4.p3 \ldots] \quad \text{(Eq. 36)}$$

and U3 has a contribution from S(i−1) due to delayed ray 4 of $$S(i-1)[C4.p2 \ldots] \quad \text{(Eq. 37)}$$

Thus the total contribution to R(i) from S(i−1) is $$C1^{\#}.[C2.p2+C3.p3+C4.p4 \ldots]+C2^{\#}.[C3.p2+C4.p3 \ldots]+\phantom{^{190}}\\.[C4.p2 \ldots] \quad \text{(Eq. 38)}$$

which is therefore the first coefficient $C11^{-1}$ of the channel polynomial C11 that describes interference between a mobile symbol and the preceding symbol for the same mobile, i.e. ISI at the output of the rake receiver. Likewise, $C11^{+1}$ describes ISI from the succeeding symbol S(i+1) and is given by $$C4^{\#}.[C3.q3+C2.q2+C1.q1 \ldots]+C3^{\#}.[C2.q3+C1.q2 \ldots]+C2^{\#}.\\ [C1.q3 \ldots] \quad \text{(Eq. 39)}$$

where now q3 is the partial correlation between the overlap of the right-hand end of the code sequence for symbol (i) with the left-hand end of the code sequence for symbol (i+1). The middle coefficient C11° of polynomial C11 is given by, $$C1^{\#} \cdot [C1 \cdot w1 + C2 \cdot w2 + C3 \cdot w3 + C4 \cdot w4 \ldots] + \quad \text{(Eq. 40)}$$
$$C2^{\#} \cdot [C1 \cdot w2 + C2 \cdot w1 + C3 \cdot w2 + C4 \cdot w3 \ldots] +$$
$$C3^{\#} \cdot [C1 \cdot w3 + C2 \cdot w2 + C3 \cdot w1 + C4 \cdot w2 \ldots] +$$
$$C4^{\#} \cdot [C1 \cdot w4 + C2 \cdot w3 + C3 \cdot w2^{*} + C4 \cdot w1 \ldots]$$

and the value of w1 is unity, as it is the correlation of a code with itself fully aligned.

The above exemplary expressions are for the case of four delayed rays, but may be extended to any number of rays in an analogous manner. Likewise, if ray delays of greater than one symbol period are encountered, the channel polynomials such as C11 may lengthen to 5 coefficients to incorporate dependence of the rake output sample on S(i−2) and S(i+2).

The entire matrix of polynomials Cij is defined in the same manner as above, except that Cij means the dependence of a sample from rake receiver (i) (which uses mobile (i)'s code, code (i), for correlation) on the symbols of mobile (j) which are spread with code (j). The values of the partial correlations above are then between overlapping segments of different codes, and in particular, the value of w1 is no longer unity, but the correlation between a symbol-length segment of code (i) and a fully aligned segment of code (j), which is zero when codes (i) and (j) are orthogonal.

If the multipath delay spread is less than an information symbol in duration, each sample stream will depend only on current information symbols, one symbol period delayed symbols and one symbol period advanced symbols, making each Z-polynomial of order three.

FIG. 15 is for the case of transmitting from one base station to 'N' mobile stations. The matrix C is then square and of size N×N.

For the case of transmitting from N diversity base stations to M mobile stations, the total number of inputs to the N base station transmitters would be MN, so the corresponding interference or coupling matrix C, which describes the coupling from each transmitter input to each mobile rake receiver output, would be of dimension MN×N. Since this is an overdimensioned case, the optimum transmit conditioning is then given by, $$T=C^{\#}[C.C^{\#}]^{-1}S \quad \text{(Eq. 41)}$$

where C is the above-defined matrix of MN×N coupling polynomials, S is a vector of information symbol sequences intended for the receivers, and T is a vector of as yet unspread sample sequences for transmission. Each of the unspread sample sequences comprises a sequence of samples at the information symbol rate, which samples however are not necessarily of the same values as information symbols, but are multi-valued samples which are additive combinations of many symbols. Each sample, being of symbol-period duration, is then multiplied by the spreading code segment for that symbol corresponding to the transmitter input to which it is applied.

The results of all inputs of the same transmitter are added and transmitted as a composite spread-spectrum (CDMA) signal. When all N transmitters collaborate in this way, the rake output of receiver (i) contains the intended information symbol stream S(i) only, with neither ISI nor interference from symbol streams intended for other receivers. If instead of $[C.C^{\#}]^{edj}$, $[C.C^{\#}]^{edj}$ is used instead, the rake output will be free of interference from non-intended symbol streams, but will contain ISI. The ISI delay spread will depend on whether all of the determinant of $C.C^{\#}$ is omitted from the inverse, or whether only ill-conditioned poles are omitted. The advantage of the overdimensioned case is that all the poles of the determinant lie further from the unit circle, and therefore are more well-conditioned.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of employing coherent transmit diversity in a wireless communication network, the method comprising:

forming a plurality of transmit signals, each comprising a combination of information signals intended for different ones of a plurality of wireless receivers, such that, at each one of said wireless receivers, the intended information signals in the plurality of transmit signals tend to add in free space while the other information signals tend to cancel in free space; and coherently transmitting said transmit signals from said plurality of transmitters over different propagation channels to said plurality of receivers.

2. The method of claim 1 further comprising maintaining a set of channel estimates for propagation channels between each one of said transmitters and each one of said wireless receivers.

3. The method of claim 2 wherein forming a plurality of transmit signals to be coherently transmitted from a plurality of transmitters as combinations of information signals intended for different ones of a plurality of wireless receivers comprises, for each said transmit signal:

determining a set of filters based on the channel estimates for propagation paths between a transmitter from which said transmit signal is to be transmitted and each one of said plurality of wireless receivers;

filtering said information signals in respective ones of said set of filters to form individually filtered information signals; and summing said individually filtered information signals to form said transmit signal.

4. The method of claim 3 further comprising generating a channel estimate matrix comprising a plurality of matrix elements, each said matrix element characterizing the propagation channels between one of said transmitters and one of said wireless receivers.

5. The method of claim 4 further comprising generating said sets of filters for said transmit signals based on forming the adjoint matrix of said channel estimate matrix.

6. The method of claim 4 further comprising generating said sets of filters for said transmit signals based on forming the inverse matrix of said channel estimate matrix.

7. The method of claim 2 wherein maintaining a set of channel estimates for propagation channels between each one of said transmitters and each one of said wireless receivers comprises periodically updating a channel estimate matrix comprising matrix elements characterizing one or more propagation paths between each said transmitter and each said wireless receiver.

8. The method of claim 2 wherein forming a plurality of transmit signals to be coherently transmitted from a plurality of transmitters as combinations of information signals intended for different ones of a plurality of wireless receivers comprises, for each said transmit signal:

expressing said channel estimates in terms of frequency response;

determining a set of filters based on the frequency response for propagation paths between a transmitter from which said transmit signal is to be transmitted and each one of said plurality of wireless receivers;

filtering said information signals in respective ones of said set of filters to form individually filtered information signals; and summing said individually filtered information signals to form said transmit signal.

9. The method of claim 8 wherein determining a set of filters based on the frequency response for propagation paths between a transmitter from which said transmit signal is to be transmitted and each one of said plurality of wireless receivers comprises adding numerator zeros to a zero/pole frequency response expression to flatten poles having an excessive response characteristic.

10. The method of claim 1 wherein coherently transmitting said transmit signals from said plurality of transmitters over different propagation channels comprises coherently transmitting said plurality of transmit signals from respective ones of a plurality of spaced apart transmit antennas.

11. The method of claim 10 wherein transmitting said plurality of transmit signals from respective ones of a plurality of spaced apart transmit antennas comprises:

synchronizing distribution of said transmit signals between radio base stations associated with said plurality of spaced apart transmit antennas; and translating each said transmit signal at the corresponding radio base station into a signal suitable for transmission from one of said transmit antennas.

12. The method of claim 1 wherein coherently transmitting said transmit signals from said plurality of transmitters over different propagation channels comprises coherently transmitting said plurality of transmit signals on different polarizations from an antenna assembly having a like plurality of polarizations.

13. The method of claim 1 wherein employing coherent transmit diversity in a wireless communication network comprises employing coherent transmit diversity in a cellular communications network.

14. The method of claim 1 wherein forming a plurality of transmit signals to be coherently transmitted from a plurality of transmitters as combinations of information signals intended for different ones of a plurality of wireless receivers.

15. A method of transmitting signals in a wireless communication network from one or more transmitters to a plurality of receivers, the method comprising:

receiving a plurality of information signals at a transmit processor, each information signal intended for a different receiver;

generating a plurality of transmit signals by forming weighted combinations of said information signals based on channel estimates for propagation paths between said one or more transmitters and said plurality of receivers, wherein said weighted combinations are formed in consideration of the propagation paths such that, at each receiver, the information signals not intended for the receiver tend to cancel in free space, and the information signals intended for the receiver tend to add in free space; and coherently transmitting said transmit signals from said one or more transmitters to said plurality of receivers.

16. The method of claim 15 wherein said one or more transmitters comprise a plurality of transmitters, and wherein coherently transmitting said transmit signals from said one or more transmitters to said plurality of receivers comprises coherently transmitting a different one of said plurality of transmit signals from each one of said plurality of transmitters.

17. The method of claim 16 wherein maid plurality of transmitters comprise a plurality of spaced apart transmit sites, and wherein coherently transmitting a different one of said plurality of transmit signals from each one of said plurality of transmitters comprises transmitting a different one of said transmit signals from each one of said spaced apart transmit sites.

18. The method of claim 16 wherein said plurality of transmitters comprises a plurality of polarized antenna elements, and wherein coherently transmitting said transmit signals from said one or more transmitters to said plurality of receivers comprises transmitting at least one of said transmit signals on a different polarization than another of said transmit signals.

19. The method of claim 15 wherein said one or more transmitters comprise a common transmitter, and wherein coherently transmitting said transmit signals from said one or more transmitters to said plurality of receivers comprises transmitting said transmit signals from said common transmitter.

20. The method of claim 19 wherein said wireless communication network comprises a CDMA network, and further comprising using a different spreading code to form each one of said plurality of information signals.

21. The method of claim 20 further comprising forming said weighted combinations of said information signals based on cross-correlation interference at said receivers between said spreading codes.

22. The method of claim 15 wherein coherently transmitting said transmit signals from said one or more transmitters to said plurality of wireless receivers comprises coherently transmitting said plurality of combined transmit signals on a common communication channel.

23. The method of claim 22 wherein coherently transmitting said plurality of transmit signals on a common communication channel comprises coherently transmitting said transmit signals on a common TDMA frequency/time slot assignment.

24. The method of claim 22 wherein coherently transmitting said plurality of transmit signals on a common communication channel comprises coherently transmitting said transmit signals on a common CDMA code channel.

25. The method of claim 15 wherein generating a plurality of transmit signals by forming weighted combinations of said information signals based on channel estimates for propagation paths between said one or more transmitters and said plurality of receivers comprises forming a channel estimate matrix, wherein each matrix element comprises a polynomial in the delay operator z based on one or more path coefficients corresponding to one or more propagation paths between one of said transmitting stations and one of said wireless receivers.

26. The method of claim 25 wherein generating a plurality of transmit signals by forming weighted combinations of said information signals based on channel estimates for propagation paths between said one or more transmitters and each said wireless receiver further comprises:
 filtering said plurality of information signals with IIR filters that are based on a determinant of said channel estimate matrix to generate filtered information signals;
 filtering said filtered information signals in an array of FIR filters, wherein said array of FIR filters are based on an adjoint matrix of said channel estimate matrix; and
 summing down columns of said array of FIR filters to generate respective ones of said transmit signals.

27. The method of claim 25 further comprising:
 calculating a determinant of said channel estimate matrix; and
 filtering each one of said information signals in an IIR filter based on said determinant.

28. The method of claim 27 wherein filtering each one of said information signals in an IIR filter based on said determinant comprises, for each information signal:
 running said information signal in time-forward order through a filter that uses roots of said determinant that lie inside the unit circle; and
 running said information signal in time-reverse order through a filter that uses inverses of roots of said determinant that lie outside the unit circle.

29. The method of claim 27 wherein filtering each one of said information signals in an IIR filter based on said determinant comprises basing said IIR filters on selected roots of said determinant.

30. The method of claim 29 further comprising selecting said roots of said determinant based on the proximity of each root to the unit circle.

31. The method of claim 30 further comprising selecting said roots of said determinant based on a residue of said roots calculated using Cauchy's residue theorem.

32. The method of claim 29 further comprising selecting different numbers of roots for each said IIR filter based on a delay spread capability of the wireless receiver corresponding to said information signal operated on by said IIR filter.

33. The method of claim 27 further comprising:
 determining an adjoint matrix of said channel estimate matrix;
 forming an array of FIR filters based on said adjoint matrix;
 feeding said information signals after IIR filtering into said array of FIR filters; and
 summing down the columns of said array of FIR filters to generate respective ones of said transmit signals, wherein each column of said array of FIR filters corresponds to one of said transmit signals.

34. The method of claim 25 further comprising determining a frequency domain expression for said matrix elements in said channel estimate matrix.

35. The method of claim 34 further comprising using said frequency domain expressions to implement power spectral shaping for said transmit signals to minimize signal power transmitted in spectral regions with high relative signal attenuation.

36. The method of claim 35 further comprising determining a spot-frequency inverse matrix for said channel estimate matrix based on said frequency domain expressions.

37. The method of claim 15 wherein at least one of said transmitters comprises a transmit antenna of a different polarization, and wherein coherently transmitting said combined transmit signals from said plurality of transmitting stations to said plurality of wireless receivers comprises transmitting at least one of said combined transmit signals on said different polarization.

38. The method of claim 15 wherein said one or more transmitters comprises a plurality of spaced apart transmit sites, and further comprising synchronizing distribution of said transmit signals to said spaced apart transmit sites to maintain coherency of transmission between said transmit signals.

39. The method of claim 15 wherein said one or more transmitters comprises a plurality of transmitters equal to said plurality of wireless receivers.

40. The method of claim 15 wherein said one or more transmitters comprises a plurality of transmitters greater than said plurality of wireless receivers.

41. A method of reducing interference at one or more receivers, the method comprising:
 pre-filtering information signals for one or more receivers using channel estimates representing propagation channels between two or more transmitters and said one or more receivers to form two or more transmit signals, such that said transmit signals combine in free space at said one or more receivers to reduce interference between information signals; and
 transmitting a different one of said transmit signals from each one of said two or more transmitters.

42. The method of claim 41 wherein pro-filtering information signals for one or more receivers using channel estimates representing propagation channels between two or more transmitters and the receiver to form two or more transmit signals comprises forming transmit pro-filters using a channel estimate matrix representing a set of propagation channels between said transmitters and said one or more receiver.

43. The method of claim 42 wherein forming transmit pre-filters using a channel estimate matrix representing a set of propagation channels between said transmitters and said one or more receiver comprises forming said channel estimate matrix with matrix rows corresponding to said one or more receivers and matrix columns corresponding to said two or more transmitters, such that each matrix element represents one or more propagation paths between a given transmitter and a given receiver.

44. The method of claim 43 further comprising forming a filter array as the adjoint matrix of the channel estimate matrix.

45. The method of claim 43 further comprising forming IIR fitters for each said information signal based on the determinant of the channel estimate matrix.

46. A method of transmitting signals in a wireless communication network from a plurality of transmitting stations to a plurality of receivers, the method comprising:
   forming a matrix of elements, each element being a multi-valued element describing the propagation path from one of said transmitting stations to one said receivers;
   forming an inverse of said matrix comprising an adjoint matrix and a determinant;
   determining the frequency response from a signal input in said communications network to a receiver for which the signal applied to said signal input is intended, assuming said inverse matrix is used far filtering end combining said applied signals to obtain signals for transmission from respective transmitting stations;
   forming said applied signal based on information to be transmitted to said intended receiver and said frequency response so that the information is coded in said applied signal to produce a spectrum of the applied signal that has low energy at frequencies where said frequency response is indicative of high net transmitted signal power attenuation of the total power transmitted from said transmitting stations in reaching said intended receiver and high energy at frequencies where said power attenuation is low.

47. The method of claim 46 in which said signal spectrum is formed using the water-pouring technique.

48. The method of claim 46 further comprising:
   filtering said applied signals using filters based on said adjoint matrix and said determinant.

49. The method of claim 46 in which said filters are based on said determinant with selected factors representative of frequency response peaks deleted.

50. A wireless communication network comprising:
   a transmitter operative to transmit a plurality of transmit signals to a plurality of receivers; and
   a transmit processor operative to form said transmit signals as weighted combinations of individual information signals intended for respective ones of said plurality of receivers by weighting said information signals using channel estimates representing propagation channels between said transmitter and said receivers;
   wherein said weighted combinations are formed in consideration of the propagation channels such that, at each receiver, the information signals not intended for the receiver tend to cancel in free space, and the information signals intended for the receiver tend to add in free space.

51. The wireless communication network of claim 50 wherein said wireless communication network comprises a CDMA communication network.

52. The wireless communication network of claim 51 wherein said transmitter comprises a transmitting site operative to transmit said transmit signals to said receivers.

53. The wireless communication network of claim 51 wherein said transmit processor is further operative to form said weighted combinations of said information signals based on cross-correlation interference at said receivers.

54. A wireless communication network comprising:
   a plurality of transmitters operative to transmit a plurality of transmit signals over different propagation channels to one or more receivers; and
   a transmit processor operative to form said plurality of transmit signals by pre-filtering one or more information signals intended for said one or more receivers using channel estimates representing propagation channels between said transmitters and said one or more receivers;
   wherein said transmit signals are formed by pre-filtering in consideration of the propagation paths such that, at each receiver, the information signals not intended for the receiver tend to cancel in free space, and the information signals intended for the receiver tend to add in free space.

55. The wireless communication network of claim 54 wherein said plurality of transmitters comprises a plurality of spaced apart transmitters, each said spaced apart transmitter transmitting one of said plurality of transmit signals.

56. The wireless communication network of claim 54 wherein said plurality of transmitters comprises a plurality of polarized antenna elements, and wherein at least one of said transmit signals is transmitted on a different polarization.

57. The wireless communication network of claim 54 wherein said plurality of transmitters comprises a plurality of base stations communicatively coupled to said transmit processor.

58. The wireless communication network of claim 54 wherein said transmit processor comprises a matrix calculator operative to form a channel estimate matrix, such that each matrix element in said channel estimate matrix represents one or more propagation paths between one of said transmitters and one of said one or more receivers.

59. The wireless communication network of claim 58 wherein said transmit processor further comprises a numeric processor operative to form sets of filters to perform said pre-filtering of said information signals, said filter coefficients based on said channel estimate matrix.

60. The wireless communication network of claim 59 wherein said channel estimate matrix comprises matrix rows corresponding to receivers and matrix columns corresponding to transmitters, and wherein said numeric processor comprises an array of FIR filters formed as the adjoint of the channel estimate matrix to filter the information signals.

61. The wireless communication network of claim 60 wherein said numeric processor comprises IIR filters formed based on the determinant of the channel estimate matrix for filtering the information signals before filtering in said array of FIR filters.

62. The wireless communication network of claim 54 wherein said transmit processor comprises one or more digital signal processors.

63. The wireless communication network of claim 54 wherein said transmit processor comprises one or more memory elements for storing said channel estimates.

* * * * *